(12) United States Patent
Skupin et al.

(10) Patent No.: US 12,452,409 B2
(45) Date of Patent: Oct. 21, 2025

(54) VIDEO CODING CONCEPT ALLOWING FOR LIMITATION OF DRIFT

(71) Applicant: FRAUNHOFER-GESELLSCHAFT ZUR FÖRDERUNG DER ANGEWANDTEN FORSCHUNG E.V., Munich (DE)

(72) Inventors: Robert Skupin, Berlin (DE); Christian Bartnik, Berlin (DE); Adam Wieckowski, Berlin (DE); Yago Sánchez De La Fuente, Berlin (DE); Cornelius Hellge, Berlin (DE); Benjamin Bross, Berlin (DE); Thomas Schierl, Berlin (DE); Thomas Wiegand, Berlin (DE); Detlev Marpe, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 132 days.

(21) Appl. No.: 18/547,136

(22) PCT Filed: Feb. 26, 2022

(86) PCT No.: PCT/EP2022/054900
§ 371 (c)(1),
(2) Date: Aug. 18, 2023

(87) PCT Pub. No.: WO2022/180261
PCT Pub. Date: Sep. 1, 2022

(65) Prior Publication Data
US 2024/0155114 A1    May 9, 2024

(30) Foreign Application Priority Data

Feb. 26, 2021 (EP) ..................... 21159767

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/172* (2014.11); *H04N 19/521* (2014.11); *H04N 19/70* (2014.11)

(58) Field of Classification Search
CPC .. H04N 19/105; H04N 19/159; H04N 19/172; H04N 19/521; H04N 19/70;
(Continued)

(56) References Cited

U.S. PATENT DOCUMENTS

2019/0014363 A1* 1/2019 Skupin ............ H04N 21/23439

FOREIGN PATENT DOCUMENTS

| WO | WO-2020228833 A1 * | 11/2020 | ........... H04N 19/117 |
| WO | WO-2020232269 A1 * | 11/2020 | ........... H04N 19/105 |

OTHER PUBLICATIONS

JVET-V0060.*
(Continued)

*Primary Examiner* — Shadan E Haghani
(74) *Attorney, Agent, or Firm* — Sage Patent Group

(57) ABSTRACT

A video decoder for decoding a video from a data stream is configured to decode an indication from the data stream which is valid for a sequence of pictures of the video, and indicates that RASL pictures within the sequence of pictures are coded in a manner excluding a predetermined set of one or more coding tools.

18 Claims, 12 Drawing Sheets

(51) Int. Cl.
*H04N 19/172* (2014.01)
*H04N 19/513* (2014.01)
*H04N 19/70* (2014.01)

(58) Field of Classification Search
CPC .... H04N 19/157; H04N 19/33; H04N 19/513; H04N 19/103; H04N 19/132; H04N 19/587
See application file for complete search history.

(56) References Cited

OTHER PUBLICATIONS

JVET-W0133.*
JVET-0101.*
Wei-Jung Chien, et al., "Motion Vector Coding and Block Merging in the Versatile Video Coding Standard", IEEE Transactions on Circuits and Systems for Video Technology, vol. 31, No. 10, Oct. 2021, pp. 3848-3861 (14 pages).
Jan De Cock, et al., "Complexity-Based Consistent-Quality Encoding in the Cloud", 2016 IEEE International Conference on Image Processing (ICIP). IEEE, 2016, 5 pages.
"Guidelines for Implementation: DASH-IF Interoperability Points", 3. DASH Industry Forum Implementation Guidelines, Sep. 25, 2019, 147 pages, [Online]. Available: https://dashif.org/guidelines/.
ISO/IEC JTC 1, Information technology—Dynamic adaptive streaming over http (DASH)—Part 1: Media presentation description and segment formats, ISO/IEC 23009-1, 2012 (and subsequent editions), First Edition Apr. 1, 2012, 15 pages.
"Versatile video coding", ITU-T and ISO/IEC JTC 1, Series H: Audiovisual and Multimedia Systems Infrastructure of audiovisual services—Coding of moving video, Rec. ITU-T H.266 and ISO/IEC 23090-3 (VVC), ITU-T H.266, Aug. 2020, 516 pages.
Daniel Luo, et al., "Description of Core Experiment 1 (CE1): Reference picture resampling filters", Joint Video Experts Team (JVET) of ITU-T SG 16 WP 3 and ISO/IEC JTC 1/SC 29/WG 11, JVET-O2021-v3, 15th Meeting: Gothenburg, SE, Jul. 3-12, 2019, 14 pages.
Mathias Wien, et al., "VVC Verification Test Report for Ultra High Definition (UHD) Standard Dynamic Range (SDR) Video Content", Joint Video Experts Team (JVET) of ITU-T SG 16 WP 3 and ISO/IEC JTC 1/SC 29, JVET-T2020, 20th Meeting, by teleconference, Oct. 7-16, 2020, 12 pages.
Heiko Schwarz, et al., "Analysis of Hierarchical B Pictures and MCTF", ICME 2006, IEEE International Conference on Multimedia and Expo, Toronto, Ontario, Canada, Jul. 2006, 4 pages.
"Advanced Video Coding for generic audio-visual services", Rec. ITU-T H.264 and ISO/IEC 14496-10 (AVC), Series H: Audiovisual and Multimedia Systems Infrastructure of audiovisual services—Coding of moving video, ITU-T H.264, Jun. 2019, 836 pages.
"High efficiency video coding", Rec. ITU-T H.265 and ISO/IEC 23008-2 (HEVC), Series H: Audiovisual and Multimedia Systems Infrastructure of audiovisual services—Coding of moving video, ITU-T H.265, Nov. 2019, 712 pages.
Ye-Kui Wang, et al., "The High-Level Syntax of the Versatile Video Coding (VVC) Standard", IEEE Transactions on Circuits and Systems for Video Technology, vol. 31, No. 10, Oct. 2021, pp. 3779-3800 (22 pages).
Ye Yan, et al., "Seamless Switching of H.265/HEVC-Coded DASH Representations With Open Gop Prediction Structure", 2015 IEEE International Conference on Image Processing (ICIP). IEEE, 2015, 5 pages.
Haitao Yang, et al., "Subblock-Based Motion Derivation and Inter Prediction Refinement in the Versatile Video Coding Standard", IEEE Transactions on Circuits and Systems for Video Technology, vol. 31, No. 10, Oct. 2021, pp. 3862-3877 (16 pages).
International Search Report for PCT/EP2022/054900 dated Jun. 2, 2022, 3 pages.
Written Opinion of the ISA for PCT/EP2022/054900 dated Jun. 2, 2022, 7 pages.

* cited by examiner

VIDEO CODING CONCEPT ALLOWING FOR LIMITATION OF DRIFT

This application is the U.S. national phase of International Application No. PCT/EP2022/054900 filed Feb. 26, 2022 which designated the U.S. and claims priority to EP Patent Application No. 21159767.9 filed Feb. 26, 2021, the entire contents of each of which are hereby incorporated by reference.

The present application is concerned with video coding and concepts suitable for limiting drift.

HTTP streaming of coded video has become an important path of video distribution over the last decade and OTT service providers can reach hundreds of millions of users via the public internet today. Standard protocols such as Dynamic Adaptive Streaming over HTTP (DASH) [1] enable a service provider to stream media to clients by having a server offering the media at various bitrates in a temporally segmented form. A client device is then able to download successive segments for continuous playback by selecting amongst the offered variants of a particular segment according to the available network bandwidth and its decoding capabilities in a dynamic and adaptive fashion. In practice, the content is offered as multiple so-called representations generated by optimized bitrate ladders, which often involve multiple resolutions and fidelities in order to optimize the perceived quality for a particular bitrate and thereby user experience [2]. Since each segment is typically coded without dependencies to earlier segments using so-called closed Group-Of-Pictures (GOP) coding structures [2], the downloaded and depacketized segment data can be concatenated to a conforming bitstream and fed into a decoder. Opposed to such closed GOP structures, segments using so-called open GOP coding structures contain some pictures that employ inter-prediction from pictures in earlier segments which benefits coding efficiency. While the pictures using inter-prediction from earlier segments can be skipped from being output without playback issues or visual artefacts when random accessing a segment as they come first in presentation order, an issue arises when a resolution switch occurs during continuous playout as these pictures are skipped at such a non-seamless switch. Even in pure bitrate switching some pictures may be dropped or exhibit severe visual artefacts when segments are not encoded properly for switching.

Proliferated earlier generation codecs such as AVC [4] and HEVC [5] do not offer reference picture resampling (RPR) functionality required to use reference pictures of different resolution. Therefore, after resolution switching, when performed at such open GOP structures, some pictures of a segment cannot be correctly decoded as reference pictures from earlier segments are not available in the required resolution which results in non-constant frame rate playout at the segment switch from dropped pictures. In [6], the authors presented approaches to overcome the issue of open GOP resolution switching by either employing normative changes to the HEVC decoding process or using the less proliferated scalable extension of HEVC (SHVC) that offers RPR functionality. However, the available solutions have not enabled substantial adoption of open GOP coding in HTTP streaming up to now.

The recently finalized version 1 of the Versatile Video Coding (VVC) standard [7] is the latest video coding standard that emerged from the collaborative work of the Video Coding Expert Group of ITU-T and the Sub Committee 29 of ISO/IEC also known as Moving Picture Experts Group. Aside offering substantially increased coding efficiency compared to earlier generation codecs [8], VVC also includes many application-driven features in the initial Main 10 profile such as RPR. During VVC development, RPR was mainly investigated in the context of conversational scenarios with low-delay coding structures [9] where real-world requirements on latency and buffer sizes set tight limits for the feasibility of insertion of intra coded pictures for resolution switching.

However, RPR in VVC can also provide substantial benefit to coding efficiency in video encoding for the streaming domain.

It would be favorable to have a concept at hand which enables to use open GOP resolution switching in HTTP streaming using codecs such as VVC, wherein the problems outlined above do not only occur with respect to RPR but also when forming a video bitstream by concatenating segments associated with different SNR, for instance.

Thus, it is the object of the present invention to provide a video coding concept which enables to more effectively limit the negative impacts on video quality by drift which is caused, for instance, by segmental video bitstream formation under switching between different video bitstream representations.

This object is achieved by the subject-matter of the independent claims of the present application.

Embodiments according to a first aspect of the invention provide a video decoder for decoding a video from a data stream, the video decoder being configured to decode an indication (e.g. gci_rasl_pictures_tool_constraint_flag) from the data stream which is valid for a sequence of pictures of the video, and which indicates that RASL pictures within the sequence of pictures are coded in a manner excluding a predetermined set of one or more coding tools. For example, the indication may serve as a kind of promise, so that the decoder knows that open GOP switching by concatenating separately coded open GOP versions of the video, coded at different spatial resolution and/or different SNR, does not lead to too much drift in RASL pictures. Further embodiments provide a video encoder for encoding a video into a data stream, the video encoder being configured for encoding the indication into the data stream. For example, RASL pictures denote pictures, which follow an intra-coded picture of the sequence of pictures, e.g. a CRA, in decoding order but preceding it in presentation order, and which may use reference pictures preceding the intra-coded picture in decoding order. For example, the preceding pictures may belong to a previous sequence of pictures, e.g., the intra-coded picture may be the first picture of the sequence in coding order. Due to the references to picture preceding the intra-coded picture in decoding order, the above-mentioned drift artifacts, or other types of artifacts, may occur, when switching resolution at the intra-coded picture with respect to a previous segment of the video comprising a previous intra-coded picture. Signaling the above-mentioned indication in the data stream may give a guarantee to the decoder to that resolution switching at the sequence of pictures compared to a previous sequence of pictures does not involve too much drift in the RASL picture. Accordingly, the decoder may decide, based on the indication, whether or not a resolution switching is favorable or not.

Further embodiments according to the invention provide a video decoder for decoding a video from a data stream, the video decoder being configured to decode an indication (e.g. using sps_extra_ph_bit_present_flag and ph_extra_bit, or using gci_rasl_pictures_tool_contraint_flag) from the data stream which indicates, per picture of a sequence of pictures of the video, globally for the respective picture, or on a per slice basis, whether the respective picture is coded in a manner excluding a predetermined set of one or more coding tools, the predetermined set comprising a cross-component linear-model based prediction tool (e.g. as a kind of picture wise indication that makes it possible to see that potential drift at RASL pictures is sufficiently low). Further embodiments provide a video encoder for encoding a video into a data stream, the video encoder being configured for encoding the indication into the data stream.

Advantageous aspects of the present application are the subject of dependent claims. Preferred embodiments of the present application are described below with respect to the figures.

Figure 3:
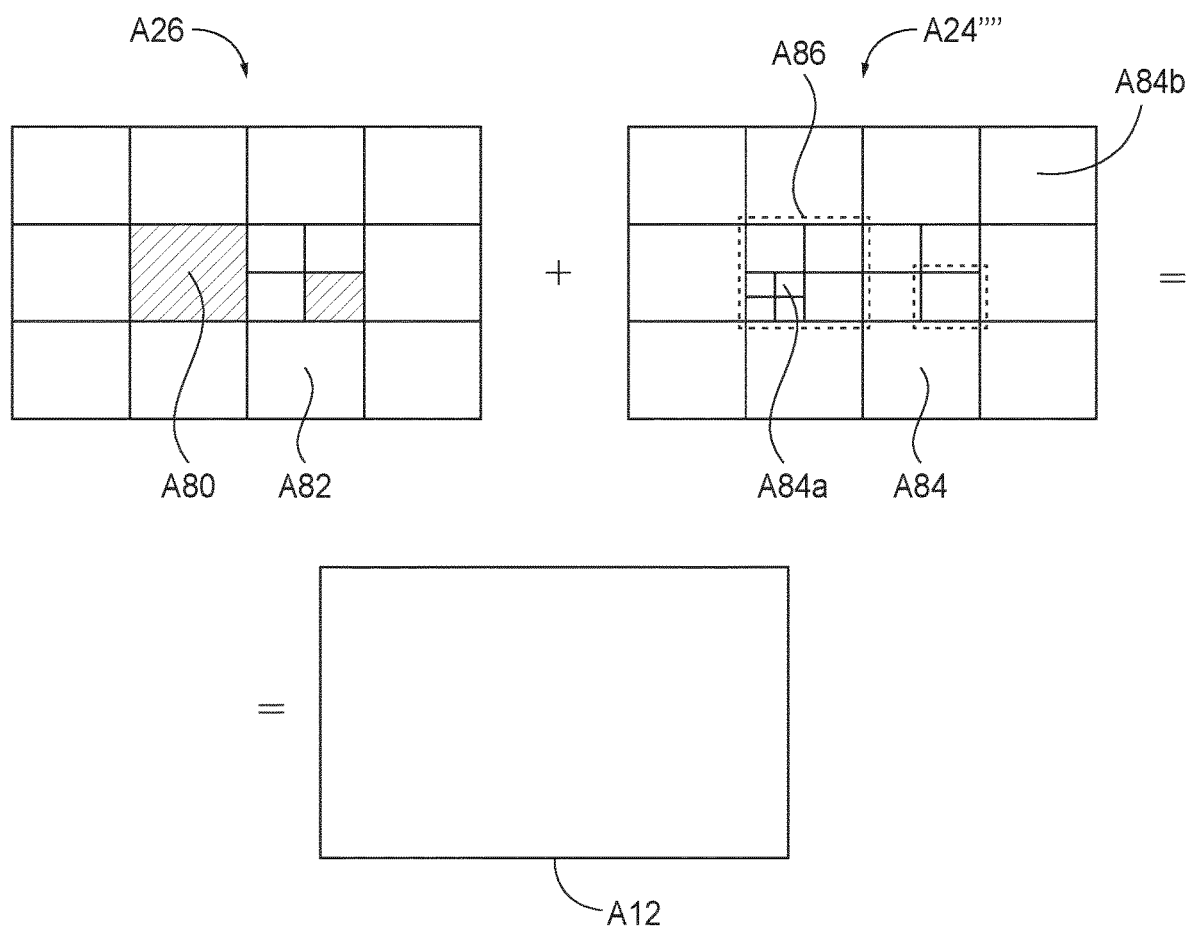
Figure 4:
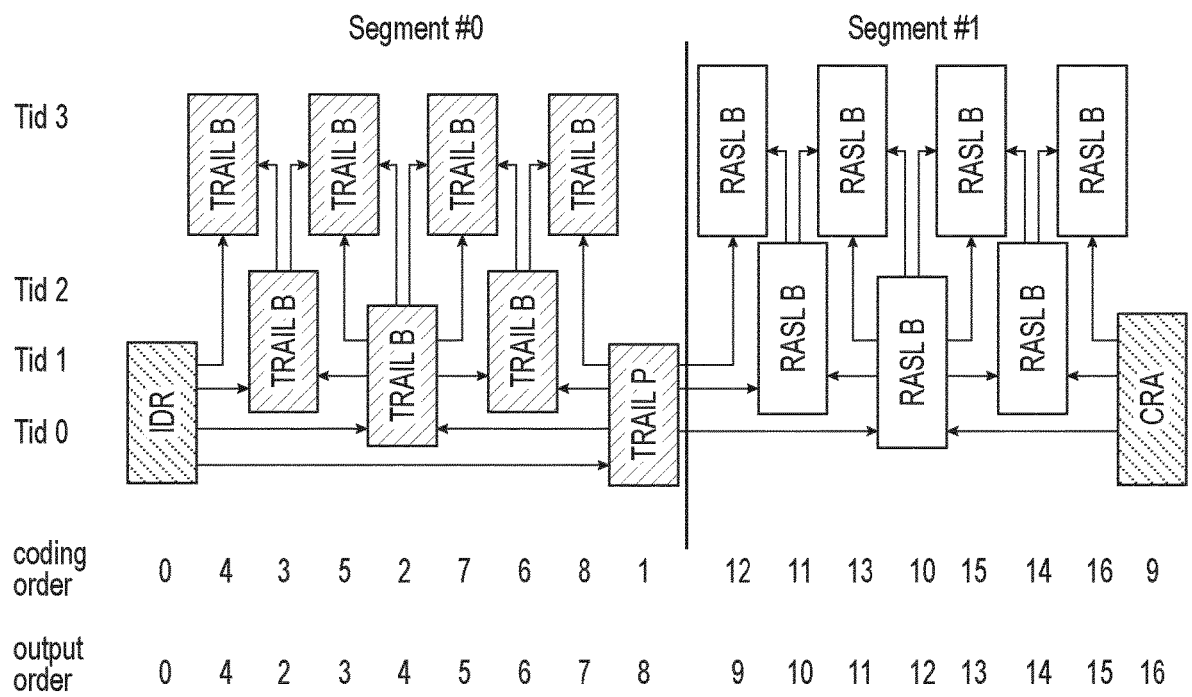
Figure 5:
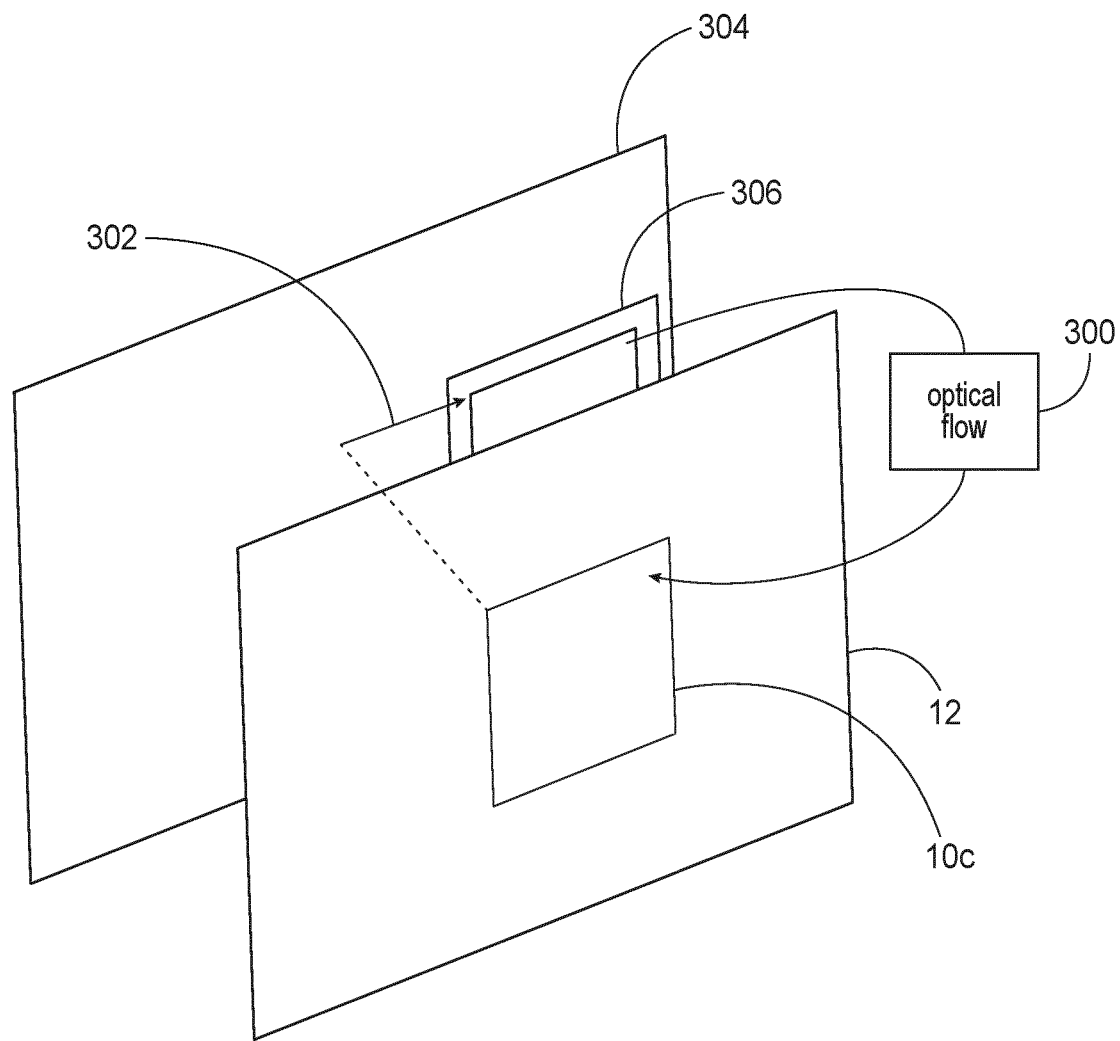
Figure 6:
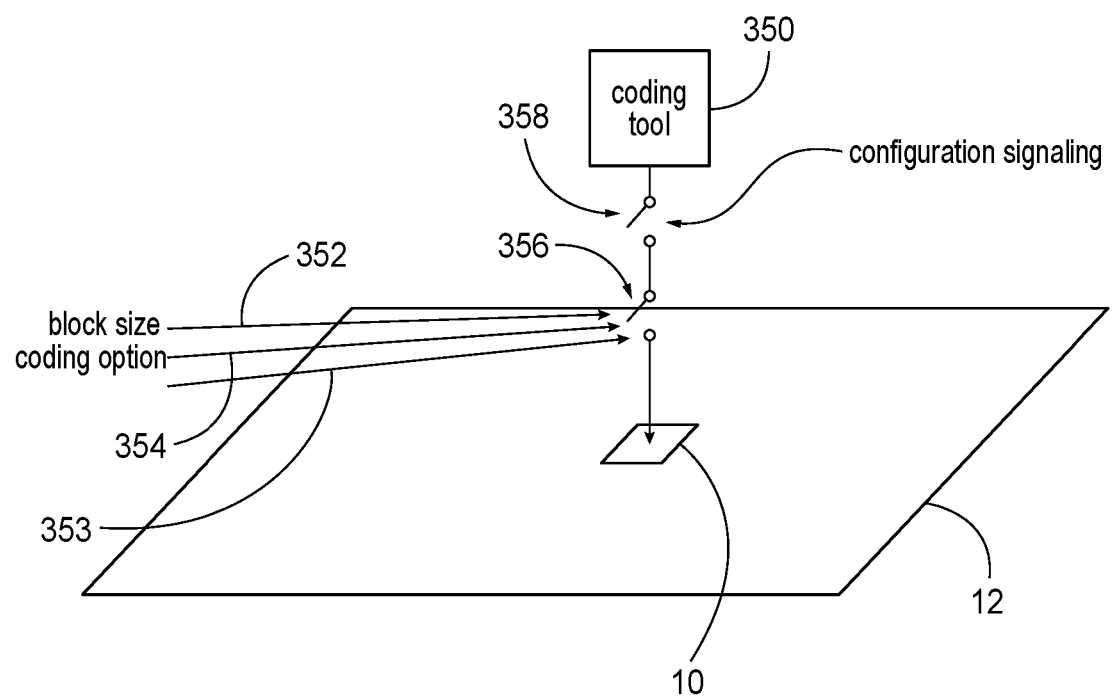
Figure 7:
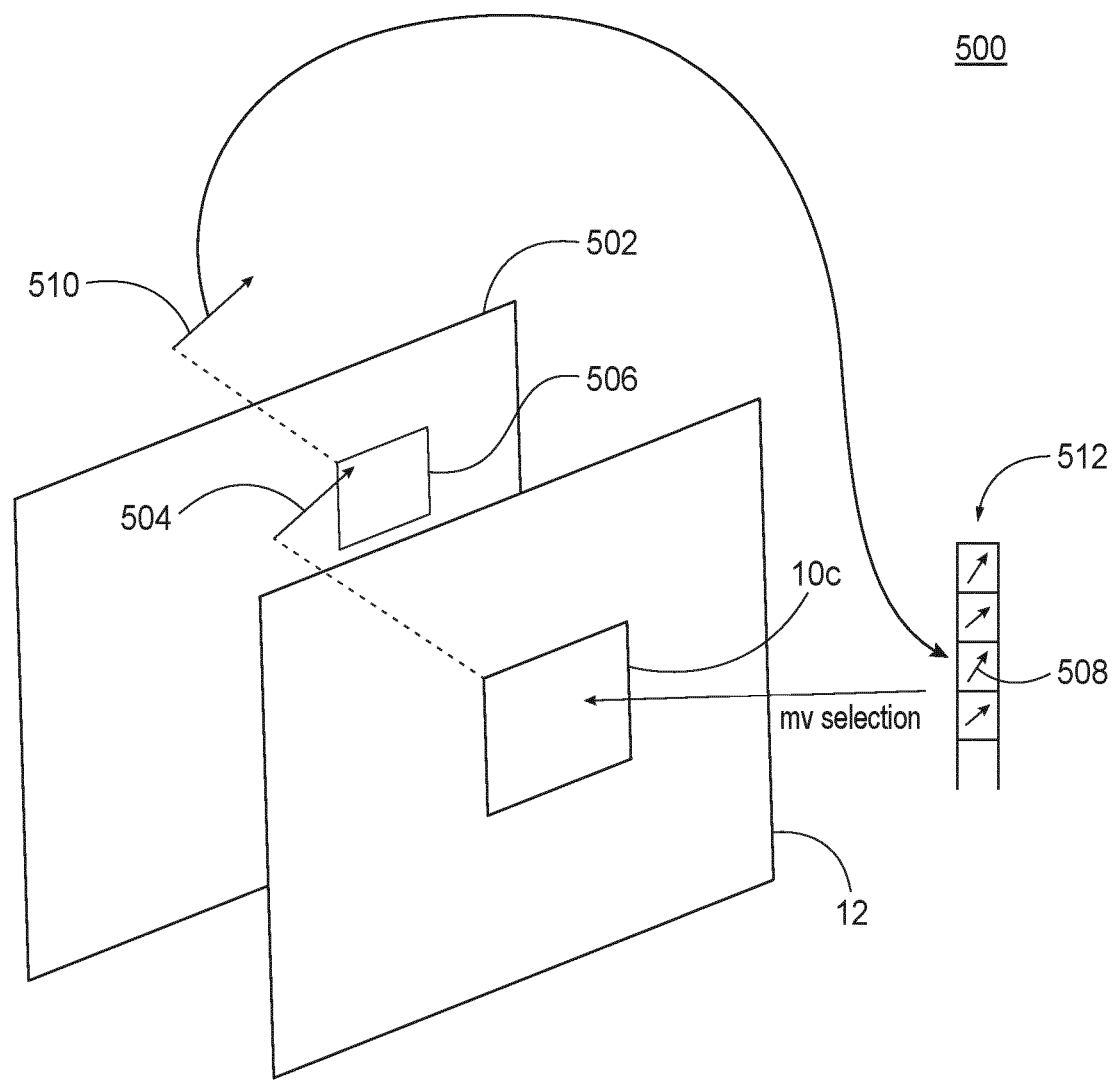
Figure 8:
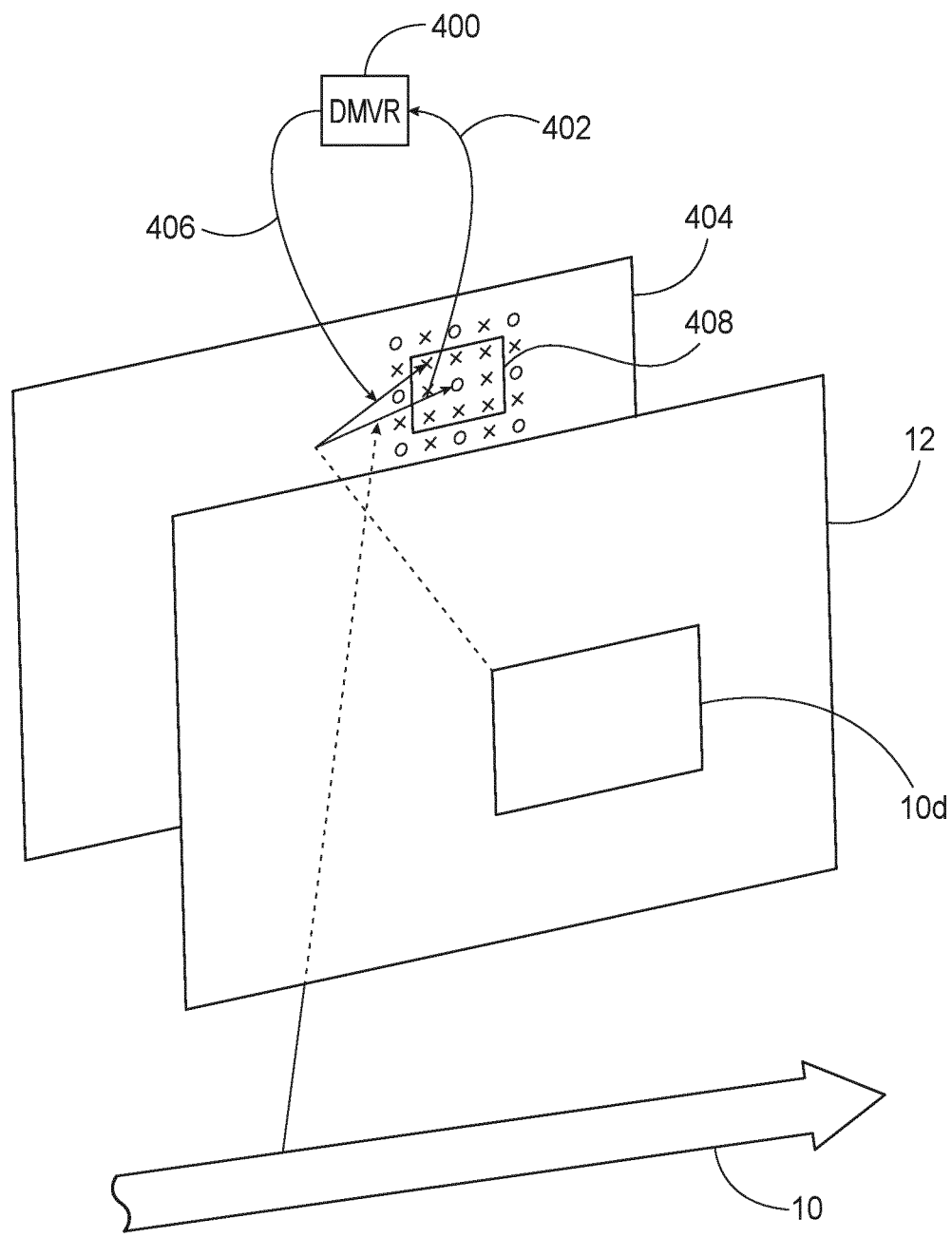
Figure 9:
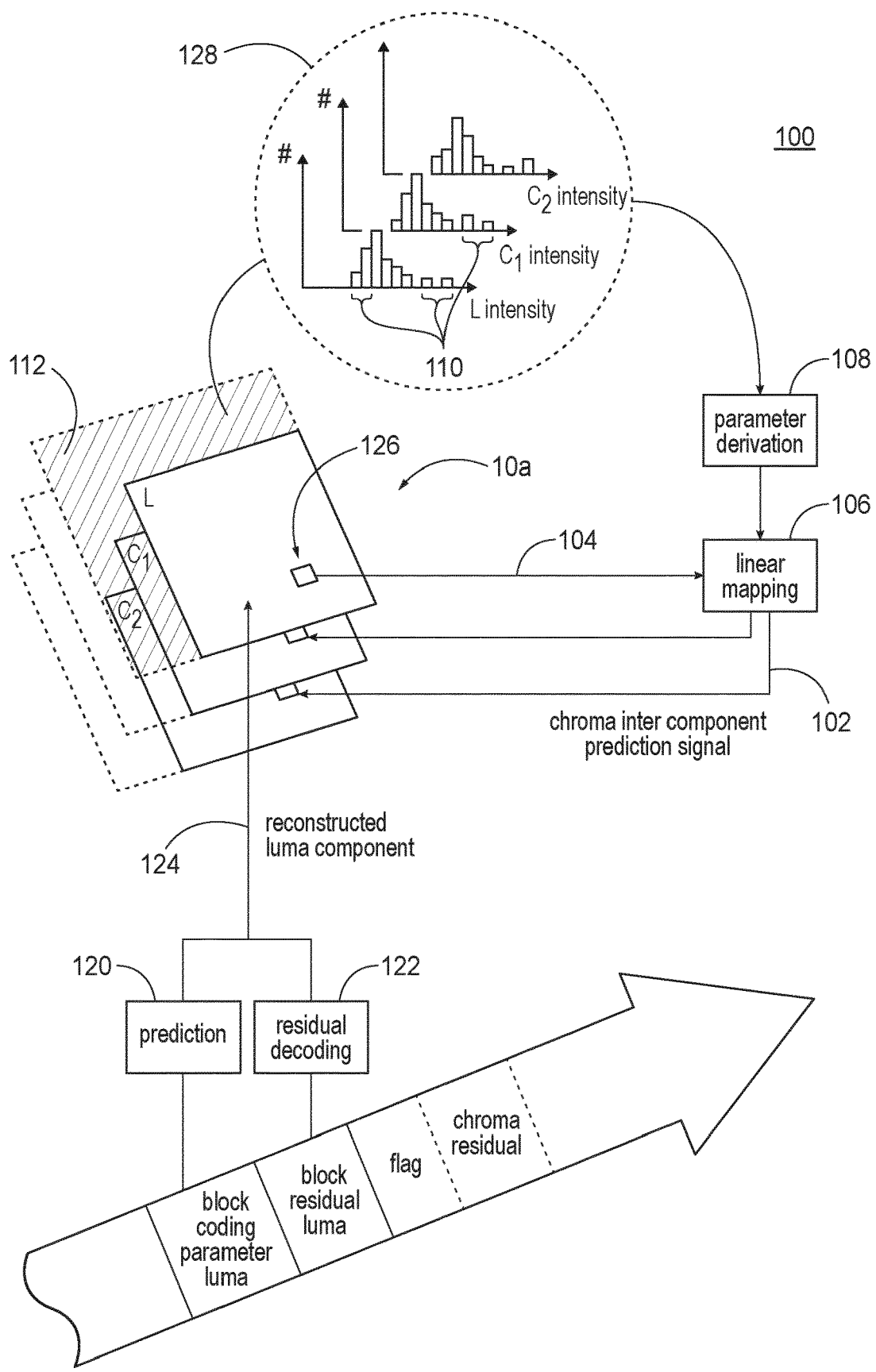
Figure 10:
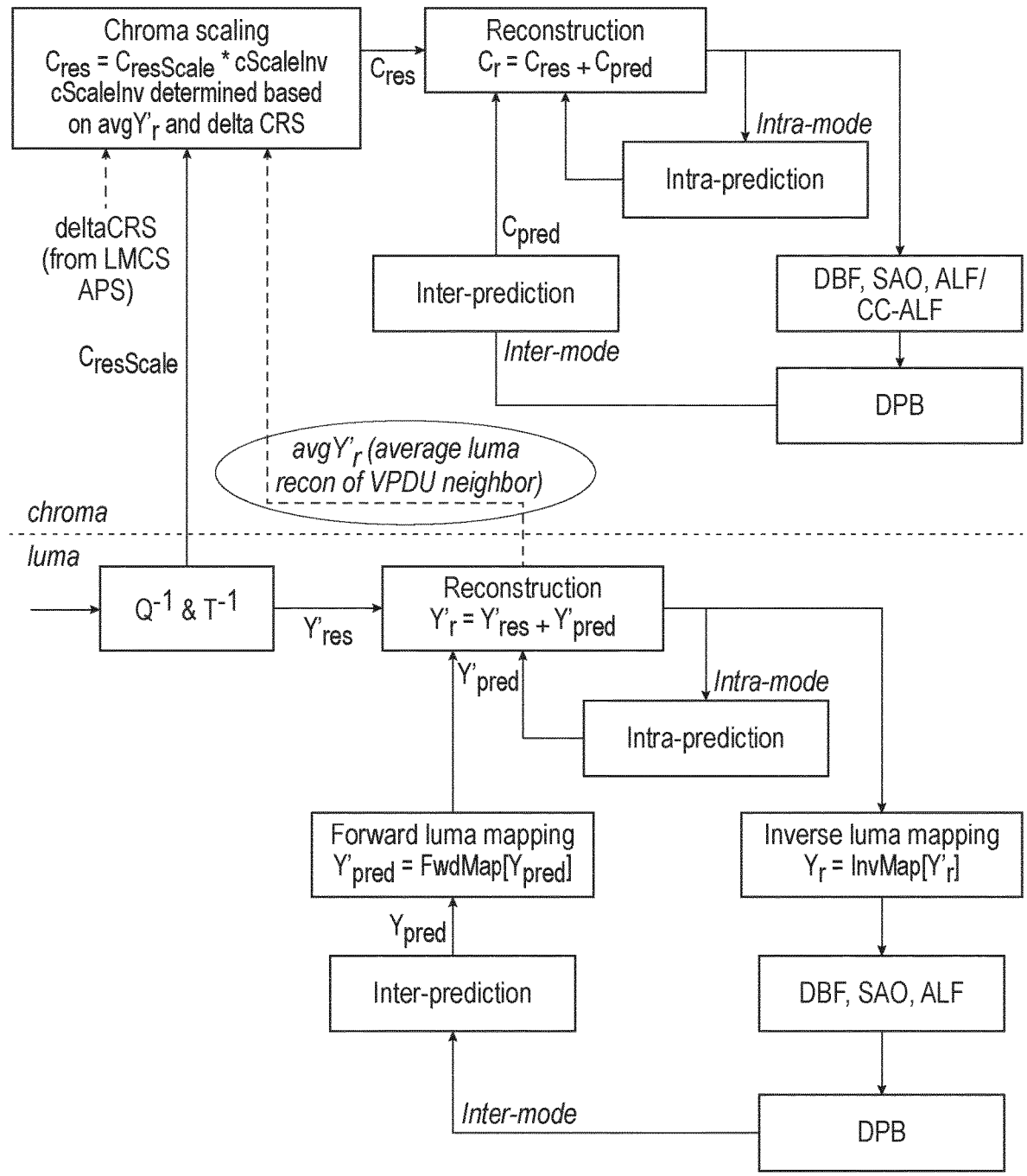
Figure 11:
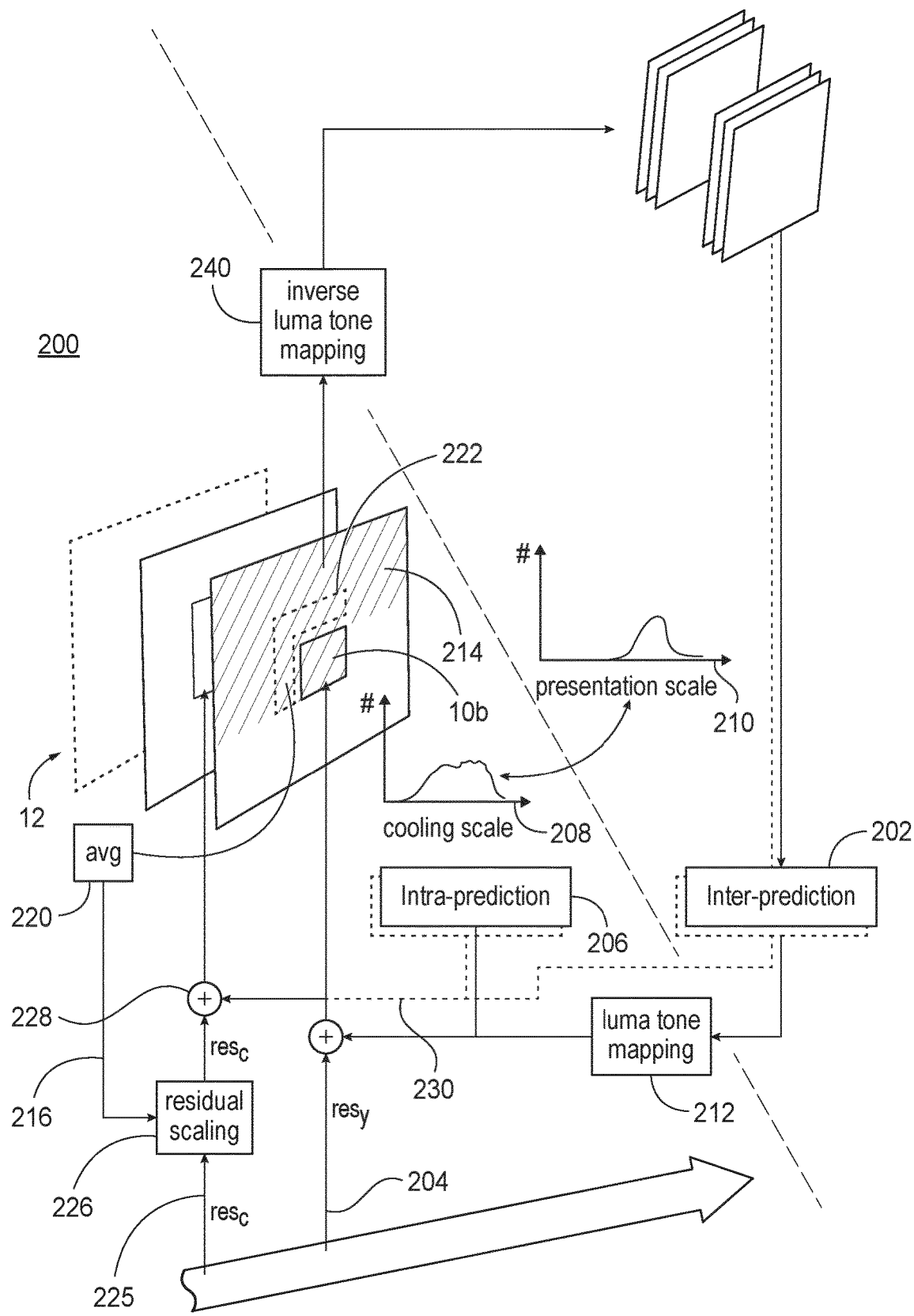
Figure 12:
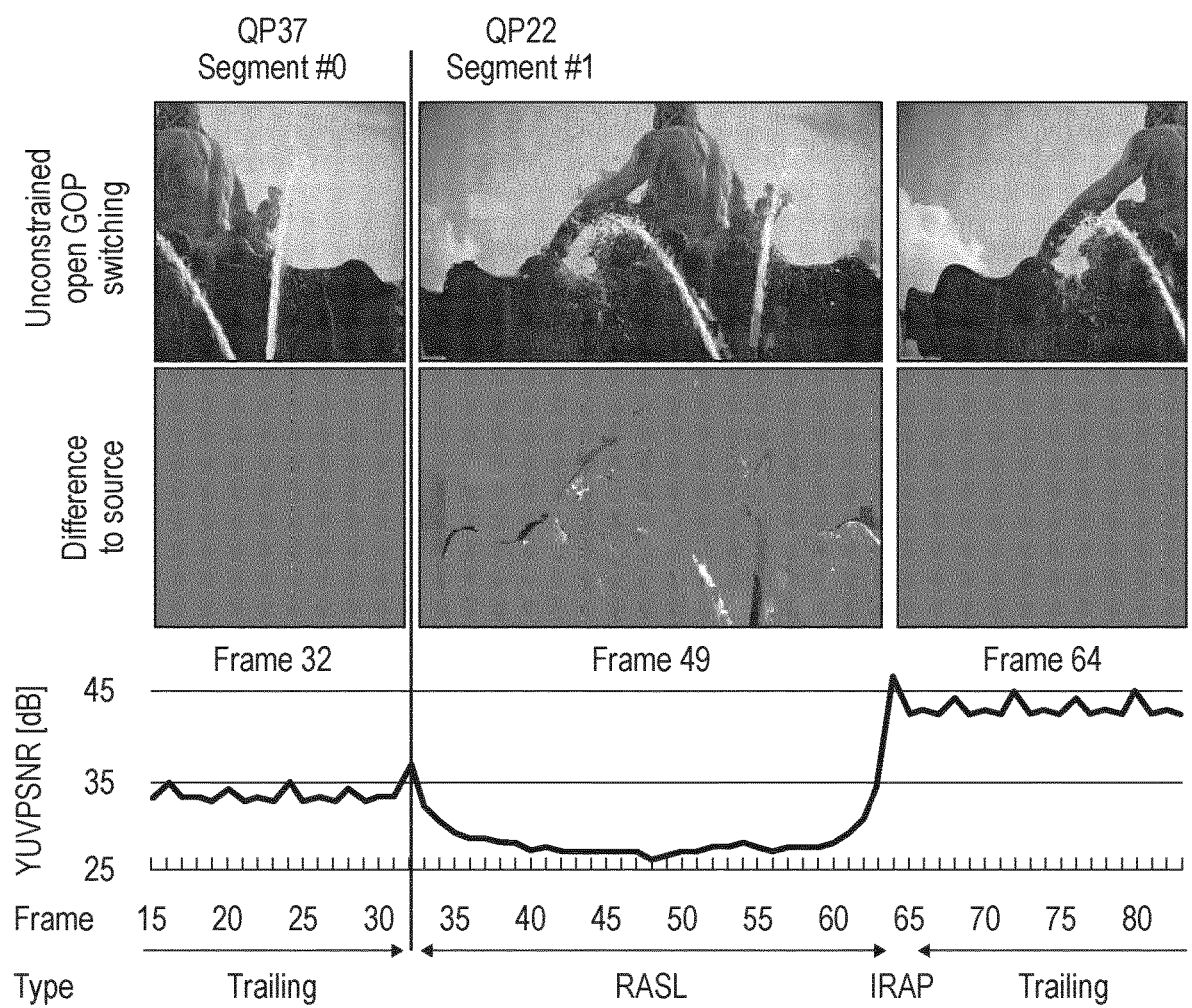

FIG. 3 illustrates a block-based residual coding scheme according to an embodiment, FIG. 4 illustrates a video data stream comprising two segments according to an embodiment, FIG. 5 illustrates a operation scheme of an optical flow tool according to an embodiment, FIG. 6 illustrates an application scheme for a coding tool according to an embodiment, FIG. 7 illustrates a operation scheme of a temporal motion vector prediction tool according to an embodiment, FIG. 8 illustrates an operation scheme of a decoder-side motion vector refinement tool according to an embodiment, FIG. 9 illustrates an operation scheme of a cross component linear model tool according to an embodiment, FIG. 10 illustrates an operation scheme of a luma mapping and chroma scaling tool according to an embodiment, FIG. 11 illustrates another operation scheme of a luma mapping and chroma scaling tool according to an embodiment, FIG. 12 illustrates an example of prediction errors in an open GOP scenario.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 1:
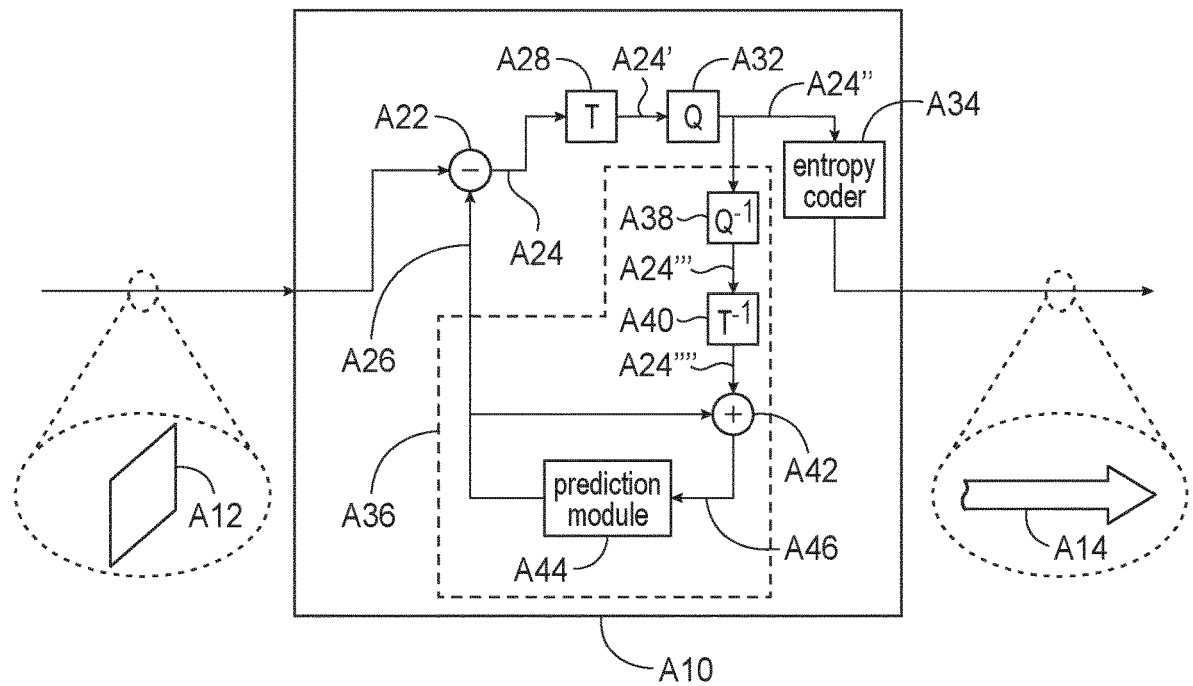
FIG. 1 illustrates a video encoder according to an embodiment.
Figure 2:
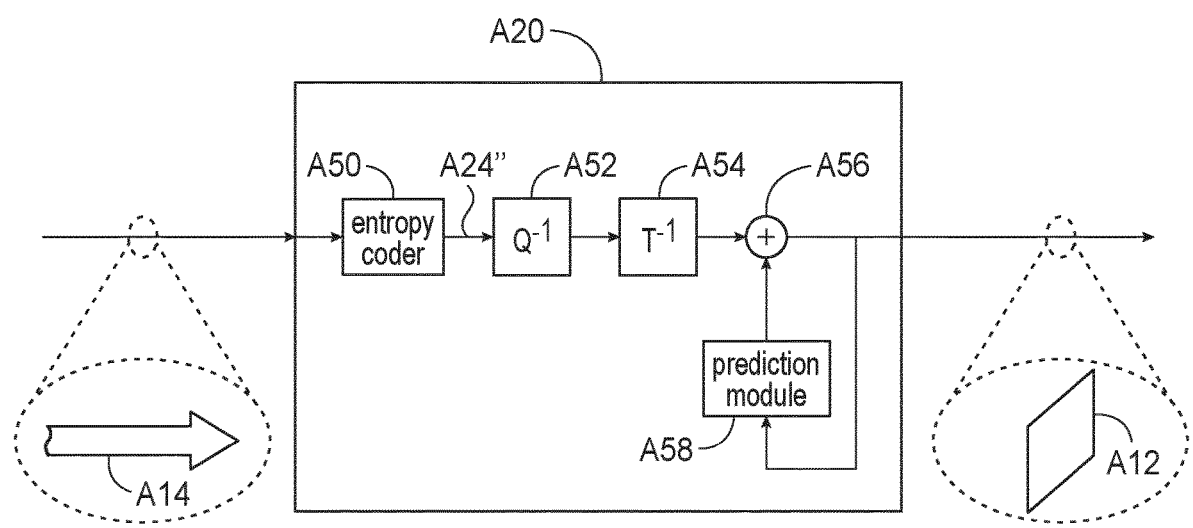
FIG. 2 illustrates a video decoder according to an embodiment.

FIG. 1 shows an apparatus for predictively coding a picture A12 into a data stream A14 exemplarily using transform-based residual coding. The apparatus, or encoder, is indicated using reference sign A10. FIG. 2 shows a corresponding decoder A20, i.e. an apparatus A20 configured to predictively decode the picture A12' from the data stream A14 also using transform-based residual decoding, wherein the apostrophe has been used to indicate that the picture A12' as reconstructed by the decoder A20 deviates from picture A12 originally encoded by apparatus A10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder A10 is configured to subject the prediction residual signal to spatial-to-spectral transformation and to encode the prediction residual signal, thus obtained, into the data stream A14. Likewise, the decoder A20 is configured to decode the prediction residual signal from the data stream A14 and subject the prediction residual signal thus obtained to spectral-to-spatial transformation.

Internally, the encoder A10 may comprise a prediction residual signal former A22 which generates a prediction residual A24 so as to measure a deviation of a prediction signal A26 from the original signal, i.e. from the picture A12. The prediction residual signal former A22 may, for instance, be a subtractor which subtracts the prediction signal from the original signal, i.e. from the picture A12. The encoder A10 then further comprises a transformer A28 which subjects the prediction residual signal A24 to a spatial-to-spectral transformation to obtain a spectral-domain prediction residual signal A24' which is then subject to quantization by a quantizer A32, also comprised by the encoder A10. The thus quantized prediction residual signal A24'' is coded into bitstream A14. To this end, encoder A10 may optionally comprise an entropy coder A34 which entropy codes the prediction residual signal as transformed and quantized into data stream A14. The prediction signal A26 is generated by a prediction stage A36 of encoder A10 on the basis of the prediction residual signal A24'' encoded into, and decodable from, data stream A14. To this end, the prediction stage A36 may internally, as is shown in FIG. 1, comprise a dequantizer A38 which dequantizes prediction residual signal A24'' so as to gain spectral-domain prediction residual signal A24''', which corresponds to signal A24' except for quantization loss, followed by an inverse transformer A40 which subjects the latter prediction residual signal A24''' to an inverse transformation, i.e. a spectral-to-spatial transformation, to obtain prediction residual signal A24'''', which corresponds to the original prediction residual signal A24 except for quantization loss. A combiner A42 of the prediction stage A36 then recombines, such as by addition, the prediction signal A26 and the prediction residual signal A24'''' so as to obtain a reconstructed signal A46, i.e. a reconstruction of the original signal A12. Reconstructed signal A46 may correspond to signal A12'. A prediction module A44 of prediction stage A36 then generates the prediction signal A26 on the basis of signal A46 by using, for instance, spatial prediction, i.e. intra-picture prediction, and/or temporal prediction, i.e. inter-picture prediction.

Likewise, decoder A20, as shown in FIG. 2, may be internally composed of components corresponding to, and interconnected in a manner corresponding to, prediction stage A36. In particular, entropy decoder A50 of decoder A20 may entropy decode the quantized spectral-domain prediction residual signal A24'' from the data stream, whereupon dequantizer A52, inverse transformer A54, combiner A56 and prediction module A58, interconnected and cooperating in the manner described above with respect to the modules of prediction stage A36, recover the reconstructed signal on the basis of prediction residual signal A24'' so that, as shown in FIG. 2, the output of combiner A56 results in the reconstructed signal, namely picture A12'.

Although not specifically described above, it is readily clear that the encoder A10 may set some coding parameters including, for instance, prediction modes, motion parameters and the like, according to some optimization scheme such as, for instance, in a manner optimizing some rate and distortion related criterion, i.e. coding cost. For example, encoder A10 and decoder A20 and the corresponding modules A44, A58, respectively, may support different prediction modes such as intra-coding modes and inter-coding modes. The granularity at which encoder and decoder switch between these prediction mode types may correspond to a subdivision of picture A12 and A12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture A12 belongs, at which the previously coded/decoded picture is sampled in order to obtain the prediction signal for the respective inter-coded block. This means, in addition to the residual signal coding comprised by data stream A14, such as the entropy-coded transform coefficient levels representing the quantized spectral-domain prediction residual signal A24'', data stream A14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture A12 and A12', respectively, into the segments. The decoder A20 uses these parameters to subdivide the picture in the same manner as the encoder did, to assign the same prediction modes to the segments, and to perform the same prediction to result in the same prediction signal.

FIG. 3 illustrates the relationship between the reconstructed signal, i.e. the reconstructed picture A12', on the one hand, and the combination of the prediction residual signal A24'''' as signaled in the data stream A14, and the prediction signal A26, on the other hand. As already denoted above, the combination may be an addition. The prediction signal A26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture A12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream A14 may have an intra-coding mode coded thereinto for intra-coded blocks A80, which assigns one of several supported intra-coding modes to the respective intra-coded block A80. For inter-coded blocks A82, the data stream A14 may have one or more motion parameters coded thereinto. Generally speaking, inter-coded blocks A82 are not restricted to being temporally coded. Alternatively, inter-coded blocks A82 may be any block predicted from previously coded portions beyond the current picture A12 itself, such as previously coded pictures of a video to which picture A12 belongs, or picture of another view or an hierarchically lower layer in the case of encoder and decoder being scalable encoders and decoders, respectively.

The prediction residual signal A24'''' in FIG. 3 is also illustrated as a subdivision of the picture area into blocks A84. These blocks might be called transform blocks in order to distinguish same from the coding blocks A80 and A82. In effect, FIG. 3 illustrates that encoder A10 and decoder A20 may use two different subdivisions of picture A12 and picture A12', respectively, into blocks, namely one subdivisioning into coding blocks A80 and A82, respectively, and another subdivision into transform blocks A84. Both subdivisions might be the same, i.e. each coding block A80 and A82, may concurrently form a transform block A84, but FIG. 3 illustrates the case where, for instance, a subdivision into transform blocks A84 forms an extension of the subdivision into coding blocks A80, A82 so that any border between two blocks of blocks A80 and A82 overlays a border between two blocks A84, or alternatively speaking each block A80, A82 either coincides with one of the transform blocks A84 or coincides with a cluster of transform blocks A84. However, the subdivisions may also be determined or selected independent from each other so that transform blocks A84 could alternatively cross block borders between blocks A80, A82. As far as the subdivision into transform blocks A84 is concerned, similar statements are thus true as those brought forward with respect to the subdivision into blocks A80, A82, i.e. the blocks A84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks A80, A82 and A84 are not restricted to being of quadratic, rectangular or any other shape.

FIG. 3 further illustrates that the combination of the prediction signal A26 and the prediction residual signal A24'''' directly results in the reconstructed signal A12'. However, it should be noted that more than one prediction signal A26 may be combined with the prediction residual signal A24'''' to result into picture A12' in accordance with alternative embodiments.

In FIG. 3, the transform blocks A84 shall have the following significance. Transformer A28 and inverse transformer A54 perform their transformations in units of these transform blocks A84. For instance, many codecs use some sort of DST or DCT for all transform blocks A84. Some codecs allow for skipping the transformation so that, for some of the transform blocks A84, the prediction residual signal is coded in the spatial domain directly. However, in accordance with embodiments described below, encoder A10 and decoder A20 are configured in such a manner that they support several transforms. For example, the transforms supported by encoder A10 and decoder A20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer A28 would support all of the forward transform versions of these transforms, the decoder A20 or inverse transformer A54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder A10 and decoder A20. In any case, it should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture A12 using the concept outlined in more detail below and being different from the encoder of FIG. 1 such as, for instance, in that the sub-division into blocks A80 is performed in a manner different than exemplified in FIG. 3. Likewise, decoders according to embodiments of the present application may perform block-based decoding of picture A12' from data stream A14 using the coding concept further outlined below, but may differ, for instance, from the decoder A20 of FIG. 2 in that same does not support intra-prediction, or in that same sub-divides picture A12' into blocks in a manner different than described with respect to FIG. 3 and/or in that same does not derive the prediction residual from the data stream A14 in transform domain, but in spatial domain, for instance.

As discussed, FIGS. 1 to 3 where merely meant to provide a rough outline of a video codec on which the subsequently outlined embodiments of the present application may be based. VVC, for instance, is an example for a video codec which the video decoder and the video encoder of FIGS. 1 and 2 may be tailored to.

The following description is structured as follows. Preliminarily, VVC is used as an example for a video codec environment and, based on this example, the following description provides a report on experiments investigating the general coding efficiency impact of open GOP coding structures as well as the picture quality impact at segment switches. Again, the embodiments described later on are not restricted to VVC, and the coding tools discussed with respect to these embodiments are not restricted to those discussed with respect to VVC, but the presentation of these experiments and the outcome thereof provides a motivation which led to the embodiments described later on. Further, the subsequent description will provide an overview of GOP coding structures and segmentation with then presenting a constrained encoding to enable open GOP switching, such as open GOP resolution switching, with effectively limiting drift associated with the switching. Thereinafter, several embodiments of the present application are presented which emerged from the considerations regarding VVC.

The following provides an overview of structures within a VVC bitstream and media segmentation for streaming. Media segments are generally aligned with intra random access point (IRAP) pictures using intra coding tools only. IRAP pictures may appear frequently in a coded video bitstream to allow functionalities such as seeking or fast forwarding, but also to serve as switching points for adaptive HTTP streaming. Systems for Video on Demand (VoD) streaming typically align segments with IRAP picture periods, i.e., IRAP pictures are typically placed at the segment start and the desired segment duration determines the temporal distance between IRAP pictures. However, there are use-cases, e.g., very low delay streaming, in which not all media segments contain an IRAP picture, so that small segments can be made available for transmission without needing to wait for an IRAP picture and thus reduce the latency at the content generation side. Segment sizes may vary in length depending on the target application. For instance, VoD services allow players to build larger buffers (e.g., 30 seconds) to overcome throughput fluctuations for which segment sizes up to several seconds (e.g. 5 seconds) can be reasonable design choice [3]. However, live services that require more stringent end-to-end delays do not allow such large buffers at the client side and hence require more frequent switching points and shorter segments of 1 second or less.

Pictures between two IRAP pictures are typically encoded in a bi-predicted hierarchical GOP structure involving reordering before presentation as far as decoding delay requirements allow because such a structure provides substantial coding efficiency benefit as introduced in AVC [10]. The hierarchy structure of a GOP can be used for temporal scalability in which decoding all pictures up to a given layer correspond to a given framerate and a corresponding Temporal Id (Tid) value is assigned to each picture as shown in FIG. 1 for a GOP size of 8 pictures. A GOP can be defined as all pictures from a first Tid 0 picture up to but not including the following Tid 0 picture in decoding order. Typically, segments include one or more GOP structures depending on IRAP period and GOP size. While in HEVC, the amount of reference picture slots in the Decoded Picture Buffer (DBP) allowed typical GOP sizes of 16 pictures, DPB capacity was increased in VVC allowing hierarchical GOP sizes of up to 32 pictures.

Pictures following an IRAP picture in decoding order but preceding it in presentation order are introduced in HEVC and referred to as leading pictures. They can be further distinguished into Random Access Skipped Leading (RASL) and Random Access Decodable Leading (RADL). While RADL pictures may only use reference picture from the IRAP picture onwards in decoding order, RASL pictures may use reference pictures preceding the IRAP in addition. IRAP pictures of the Instantaneous Random Access (IDR) type reset the DBP and can only have leading pictures that are RADL pictures leading to so-called closed GOP structures. Further, IRAP pictures of the Clean Random Access (CRA) type, on the other hand, do not reset the DPB. Hence, reconstructed pictures from before the CRA in decoding order are available as reference for future pictures, i.e. the RASL pictures allowing for so-called open GOP coding structures. RASL pictures exhibit an increased coding efficiency compared to RADL pictures but can be rendered undecodable when reference pictures are not available, e.g. during a random access at the associated IRAP at the beginning of a segment without decoding the previous segment. A more detailed overview of VVC high-level syntax can be found in [11].

FIG. 4 illustrates, for instance, a formation of a video data stream out of a concatenation of two successive segments with different resolution in which the second segment employs an open GOP coding structure with reference pictures from the first segment. In particular, referenced reference pictures are those rectangles in FIG. 4 from which arrows emerge. The arrows themselves illustrates the prediction interdependencies, i.e., they point from a reference picture to the referencing picture. Each picture is associated with a certain temporal ID Tid, and, as can be seen, the coding order deviates from the output/presentation order of the pictures. As can be seen, the pictures of output order rank 9 to 15 are RASL pictures which, directly or indirectly, reference the CRA picture of the own segment, segment 1, they belong to, as well as a picture stemming from the previous segment, segment 0, mainly the picture having output order rank 8. For example, a segment of the video may also be referred to as a sequence of pictures, which may, e.g., comprise one GOP.

When the reference pictures of a RASL picture are located in the previous segment and the streaming client switches representations after such a previous segment, the client decoder will decode the RASL picture using a different variant of at least part of the reference pictures compared to encoder side. Such a situation can lead to a non-conforming bitstream if the content is not generated appropriately or to significant mismatches in the reconstructed RASL pictures and this drift may propagate to all RASL pictures up to but not including the associated CRA picture. In the following, an appropriate generation of content is discussed which allows using open GOP structures while maintaining bitstream conformance at segment switches and avoiding undesirable drift that would be detrimental to visual quality during switches.

The numerous inter-prediction tools in VVC exhibit varying potential to cause drift when open GOP switching is carried out and at the same time, tool usage is bound by conformance constraints. Next we analyze the drift potential of the inter-prediction tools in VVC at open GOP resolution switching and a constrained encoding method to overcome severe artefacts of open GOP resolution switching while ensuring VVC conformance is proposed herein.

As to the Drift Potential of VVC Coding Tool, a first set of coding tools in VVC can be categorized as sample-to-sample prediction, e.g. regular block-based translatory motion-compensated sample prediction known from many predecessors of VVC or a newly introduced inter-prediction mode in VVC referred to as affine motion compensation (AMC) which decomposes a prediction block into smaller sub-blocks that are individually motion-compensated to emulate affine motion compensation [12]. Prediction Refinement with Optical Flow (PROF) as an optional component of AMC or Bi-directional Optical Flow (BDOF) are further newly introduced inter-prediction tools in VVC that alter predicted samples by relying on optical flow-based methods in order to emulate sample-wise inter-prediction. When a different representation is used as reference for reconstruction using such sample-to-sample prediction tools, the visual quality of the reconstructed pictures will lean towards the visual quality of said representation and away from the visual quality of the original representation. However, such sample-to-sample prediction has a comparatively low potential to cause visually disturbing artefacts but rather leads to a graceful quality transition in a given sequence of RASL pictures as prediction source samples of a first visual quality are progressively updated through residual information at a second visual quality.

FIG. 5, for instance, illustrates an optical flow tool 300 and its functionality. An inter-predicted block 10c within a picture 12 is shown. The inter-predicted block 10c is associated with a motion vector 302. That is, a motion vector 302 is signaled in the data stream for the inter-predicted block 10c. The motion vector 302 indicates the translatory displacement of the inter-predicted block 10c at which the reference picture 304 is to be sampled/copied in order to yield the translatory inter-prediction signal of the inter-predicted block 10c. If the optical flow 300 is to be used for the inter-predicted block 10c, the optical flow tool 300 improves the translatory inter-prediction signal by means of optical flow-based analysis. To be more precise, instead of merely sampling the reference picture 304 at the footprint of block 10c, displaced according to motion vector 302, the optical flow tool 300 uses a slightly larger area than the footprint of picture 10c within reference picture 304, namely area 306 in order to determine the inter-prediction signal for the inter-predicted block 10c, namely by inspecting gradients within area 306 so as to determine the inter-predicted signal. In other words, each sample of the inter-predicted signal of block 10c is determined, by use of the optical flow tool 300, by use of a gradient-sensitive FIR filtering, possibly in addition to an interpolation filtering in case of the samples of block 10c, displaced according to motion vector 302, falling at sub-pel positions within reference picture 304.

It should be noted that, while FIG. 5 merely shows one reference picture and one motion vector, the optical flow tool may also perform an optical flow analysis with respect to the two reference pictures and two motion vectors, with picture 12 being in between both reference pictures and the picture containing the inter-predicted block 10c.

Later on, when describing embodiments of the present application, the optical flow tool 300 might form one example for the coding tools being subject to exclusion from encoding in order to avoid drift. Thus, according to some embodiments described below, a video decoder and/or video encoder supports such an optical flow tool. As FIGS. 1 and 2 show possible implementations for a video decoder and a video encoder, a video decoder and encoder according to FIGS. 1 and 2, supporting an optical flow tool according to FIG. 5, may represent an exemplary basis for embodiments of the present application. Anyhow, different possibilities exist as to how to decide at the side of the decoder and the side of the encoder, respectively, whether the optical flow tool 300 is to be applied to the inter-predicted block 10c or not. For instance the optical flow tool 300 may be an inherently applied coding tool. For instance, whether or not the optical flow tool is applied for block 10c may be depend on one or more coding options signaled in the data stream for block 10c in relation to a further coding tool other than the optical flow tool. Even alternatively, the optical flow tool 300 may be an inherently applied coding tool for which the decision whether the optical flow tool 300 is applied to block 10c or not is made dependent on a size of block 10c. Naturally, both dependencies may apply. Even alternatively, the optical flow tool 300 may be an explicitly applied coding tool meaning that a syntax element is coded into the data stream which exclusively signals whether the optical flow tool 300 is to be applied to block 10c or not. In other words, this syntax element would be specific for block 10c. Note that this syntax element might not be a flag or binary valued in the sense of just being able to toggle between non-application and application of tool 350. Rather, the syntax element might be an m-ary syntax element wherein one of the m states thereof is associated, for instance, with an application of tool 350. Alternatively, the syntax element might be an m-ary syntax element wherein one of the m states thereof is associated, for instance, with a non-application of tool 350.

In the subsequently explained embodiments, the encoder signals to the decoder the exclusion of certain coding tools such as optical flow tool 300, from the encoding of RASL pictures. This signalization discussed later on needs not to act as an actual control of the availability of these coding tools for blocks of a certain picture or slices of a picture or not. Rather, this signalization or indication presented in the embodiments described further below, may act, rather, as a kind of additional signalization or promise from encoder to decoder that these certain coding tools discussed further below (or merely one coding tool) have been excluded from the encoding of certain pictures such as RASL pictures. In the latter case, the subsequently discussed indication or signalization is redundant to, or comes in addition to, configuration signaling inside the data stream which deactivates certain coding tools so that they are not available for application to picture blocks within certain pictures or picture slices. The encoder obeys the guarantee given by setting the configuration signaling and, if applicable, syntax elements associated with block-basis tool application, accordingly, i.e. so that the tool(s) is/are not used in RASL pictures, for instance. Thus, the optical flow tool may be a deactivatable coding tool which is, with respect to its application to inter-predicted blocks such as block 10c, deactivatable in units of pictures or slices by configuration data inside the data stream. For instance, such configuration signaling may be comprised by slice headers or picture headers. Whether or not, the optical flow tool 300 would be applied to a certain inter-predicted block 10c would, accordingly, be decided based on the configuration signaling, and merely if the configuration signaling indicates for the picture 12 (or the slice of picture 12), which the inter-predicted block 10c is part of, that the optical flow tool 300 is activated, i.e., available, then the explicit signalization or the inherent decision on its application described above is made.

The latter circumstance is depicted in FIG. 6 again as the general possibilities for deciding on whether to apply or not to apply a certain coding tool is similar for the coding tools discussed herein. Accordingly, FIG. 6 illustrates a currently coded picture 12 as well as a block 10 being part of picture 12. Picture block 10 is depicted merely illustratively and is, in fact, merely one picture block into which picture 12 is partitioned. The block level which block 10 belongs to may, for instance, correspond to the blocks for which the intra/inter-prediction mode decision is made, but other possibilities exist as well such as blocks smaller than the latter blocks. A possible example for partitioning picture 12 into blocks such as block 10 have been described with respect to FIG. 3. A representative coding tool 350 is shown in FIG. 6. Whether or not this coding tool is actually applied to block 10 may be controlled via the following circumstances: the application may depend on the block's size as indicated by arrow 352 and/or a coding option signaled in the data stream for the predetermined block 10 such as whether block 10 is coded using an intra block mode or inter block mode. The latter dependency is depicted in FIG. 6 using arrow 354.

Alternatively to block size dependency, or additionally, a dependency on block aspect ratio or tree partitioning level of a corresponding recursive multi-tree based partitioning tree may apply. The coding option may relate to one or more of the block being intra coded, the block being inter coded, the block being bi-prediction, the block being bi-predicted with equally spaced and oppositely positioned reference pictures and the like. Both information entities, i.e., block size/aspect ratio/split level and coding option, are signaled in the data stream, namely the block size/aspect ratio/split level by the partitioning information on the partitioning of picture 12 into blocks including block 10, and the coding option specifically for block 10, for instance. Instead of relying on an implicit block-level decision, an explicit signaling in the form of a syntax element 353 may be used to control the application of tool 350 with respect to block 10. The syntax element would be specific for block 10 and specific with respect to the tool decision for tool 350. While this application decision 356 is made on a block level, on a larger level, the application decision may additionally depend on an activation decision 358 made on a larger level such as with respect to the whole picture 12 or slices into which picture 12 is subdivided along the block coding order at which picture 12 is coded into the data stream. The activation decision 358 may be controlled by the aforementioned configuration signaling such as settings in a slice header of a slice which block 10 belongs to, or in a picture header of picture 12 or a parameter set associated with picture 12 such as a picture parameter set. Not all of the decisions 356 and 358 may apply. None of them may apply either, wherein, however, the indication discussed hereinafter would then indicate not only the activation or deactivation of a certain coding tool 350 for a certain slice, picture or RASL picture as a kind of promise or redundant signaling, but also act like the configuration signaling.

Thus, while the coding tool 350 of FIG. 6 might be the optical flow tool 300 of FIG. 5, it is depicted in FIG. 6 representatively of any of the coding tools being subject to the encoder constrained decision discussed further below.

A second set of coding tools in VVC is used for syntax (i.e. model parameter) prediction, either from syntax or samples of a picture. Similar to its predecessors, VVC allows for motion vector (MV) prediction on block basis using temporal MV candidates from a so-called collocated reference picture via Temporal Motion Vector Prediction (TMVP) [13]. This feature was extended in VVC by introducing a finer granular TMVP variant on sub-block basis (SBTMVP) adding a displacement step in finding the corresponding motion information in the collocated reference picture.

FIG. 7 illustrates a temporal motion vector prediction tool 500. This tool 500 is another example for the coding tool 350 of FIG. 6 and a further example for the coding tools discussed further below with respect to the encoder constrained indication. The temporal motion vector prediction tool is for predicting a motion vector 508 for an inter-predicted block 10c of picture 12 based on a motion vector 510 associated with a block 506 within a reference picture 502. While tool 500 could use the motion vector of a co-located block within reference picture 502 as predictor 508, according to the example of FIG. 7, tool 500 firstly derives a displacement vector 504 such as a spatially prediction motion vector, for block 10c, and uses this displacement vector 504 to locate a "co-located block 506" within reference picture 502, and the motion vector 510 of this co-located block 506 is then used for the temporally prediction motion vector candidate 508. Further, FIG. 7 illustrates that tool 500 may be operative to determine a temporally prediction motion vector 508 only for a insertion into a motion vector candidate list 512 for block 10*c* out of which one motion vector predictor is finally selected such as by use of an index signaled in the data stream for block 10*c*. Alternatively, the list 512 is construed in a certain manner leading to a certain order of the motion vector candidates within list 512, and the one with the highest rank is simply finally chosen/selected for usage in inter-predicting block 10*c*.

Note that the motion vector prediction tool of FIG. 6 shall be understood to be broad enough to also cover cases of temporal motion vector prediction in merge sense, i.e. providing a motion vector predictor en bloc with other motion prediction settings such as reference picture index, from a collocated block.

All the options discussed with respect to FIG. 6 are available for tool 500 to decide whether or not tool 500 is actually applied to block 10*c* or not. Being more precise, tool 500 may be an example for coding tool 350 in FIG. 6 where an explicit signaling in the form of syntax element 353 is used to control the application of tool 500 with respect to block 10, namely in that an index signaled in the data stream for block 10*c* selects or not selects the TMVP candidate 508 out of list 512. If not selected, tool 500 remains un-effective with respect to block 10*c*, which is interpreted as non-application of tool 500 for block 10*c*. However, configuration signaling on a higher level via decision 358 might be used to deactivate tool 500 more globally so that, for blocks residing in an area (picture or slice), for which the tool 500 is signaled to be deactivated, the list 512 is construed in a manner excluding TMVP candidate 508 anyway, and the list index would no longer act as the afore-mentioned block-level decision control. The encoder may decide which way to use in order to obey any promise given to the decoder so as to avoid drift in RASL pictures as taught herein. Further tools in the aforementioned second set can be characterized as sample-to-syntax prediction tools. A completely new inter-prediction tool introduced tool in VVC is Decoder-side Motion Vector Refinement (DMVR) which refines the accuracy of MVs in bi-prediction based on the mirroring property of two reference pictures with equal and opposing temporal distance to the current picture.

FIG. 8 illustrates a decoder-side motion vector refinement tool 400. If applied to an inter-predicted block 10*d* of a picture 12, tool 400 improves a motion vector 402 coded/signaling in the data stream for this block 10*d* for the sake of inter-predicting this block 10*d* from a reference picture 404 by means of refinement of this motion vector 402 by use of best match search. The best match search might be performed at the highest resolution supported by decoder and encoder such as ¹⁄₁₆ pel resolution. The signaled motion vector may be of lower resolution and merely serves to "substantially" indicate the refined motion vector finally determined by the DMVR tool. Different possibilities exist with respect as to what should be matched against the reference picture in order to perform the best match search. One possibility would be to use an already decoded portion adjacent to the inter-predicted block 10*d*. This portion would be subject to motion vector displacements using motion vector candidates at and around the signaled motion vector and the candidate resulting into the best match would be chosen as refined motion vector. Alternatively, it might be that block 10*d* is a bi-predicted block for which a pair of signaled motion vectors exist which are to be refined by tool 400. That is, in the case inter-predicted block 10*d* was a bi predicted block. It might be that the reference pictures would have, in presentation order, picture 12 in-between, i.e. that the reference pictures are positioned temporally before and behind picture 12. Optionally, the two reference pictures are equally temporally spaced apart from picture 12. Tool 400 might even be exclusively dedicated for this case, i.e. tool 400 would be an inherently activated on block level depending on block coding options indicating block 10*d* to be bi-predicted based on reference pictures equally spaced from the current picture 10 and having picture 10 therebetween. In that case, the pair of signaled motion vectors, one of which would be vector 402, would be refined by performing a best match search among motion vector pair candidates including and around the pair of signaled motion vectors. The best match search could be performed, for instance, by testing similarities between the reference pictures, sampled at the portions referred to be the motion vector pair candidates. The motion vector pair candidates could be restricted to ones where one motion vector candidate for one reference picture deviates from the corresponding signal motion vector for this reference picture in a manner opposite to a deviation of the other motion vector candidate for the other reference picture from the other signal motion vector for this other reference picture. For the similarity the SAD or the SSD could be used. The best matching motion vector pair candidate would then be used as a replacement 406 for the signal motion vectors, i.e. vector 402 for reference picture 404 would be replaced by 406 and the other signaled vector for the other reference picture would be replaced by the other vector of the motion vector pair candidate. Other possibilities would exist as well. For instance, the both signaled motion vectors of a bi-predicted block 10*d* could be refined individually by performing a best match search of an average of sampled patches in the two reference pictures at the two signaled motion vectors at and around the signaled motion vectors.

With respect to the decision whether the MVR tool 400 is to be applied to block 10*d*, all the alternatives discussed with respect to FIG. 6 may apply. That is, the MVR tool 400 may be a coding tool 350.

A further new tool in VVC is Cross Component Linear Model (CCLM) that allows to intra-predict the chroma components of a block from the respective luma component using a linear model wherein model parameters are derived from the reconstructed luma sample values.

The linear model transforms subsampled luma-samples $rec_L'$ into chroma prediction by the means of the following:

$$P(i,j) = a \cdot rec_L'(i,j) + b,$$

where the parameters a and b are derived from neighboring luma and chroma samples as follows. With $X_l$ and $X_s$ denoting the average of the two largest and the two smallest neighboring samples, respectively, and $Y_l$ and $Y_s$ denoting the average of the corresponding chroma sample pairs, respectively, the parameters are derived as:

$$a = (Y_l - Y_s)/(X_l - X_s)$$

$$b = Y_s - a \cdot X_s$$

Due to the parameter derivation process only accounting for the extrema of the neighboring samples values, the process is prone to extensive drift even in case of single-sample drift outliers in the neighboring blocks. Also, because of the linear model, if a is large, the luma drift might become amplified. For other intra-prediction modes, which account for all of the neighboring sample values, the drift propagation is much less apparent, and cannot be linearly amplified. Due to this inherent instability this mode needs special care when applied in applications where constrained drift is acceptable, as open GOP switching in HTTP adaptive streaming. On top of this, since in the context of the described application, the drift can only occur in RASL fames, i.e. motion predicted frames. If the encoder decides to use CCLM, i.e. an intra prediction mode, this would usually be due to a lack of an appropriate motion compensated predictor, implying a region of high temporal activity. In such regions the expected reconstruction drift for open GOP switching is expected to be high, contributing even more to the discussed instability effect.

FIG. 9 shows schematically the mode of operation of a cross component linear model tool 100. A block 10a is shown with respect to which tool 100 is applied. The luma component of this block 10a is reconstructed using any type of prediction 120 and by decoding 122 a residual signal from the data stream, within combining the prediction signal and the residual signal for luma. The aim of tool 100 is to predict the chroma component(s) based on the reconstructed luma component 124. This is done using a linear model or a linear mapping 106. This linear mapping 106 uses a scalar linear function in order to predict sample-wise for each sample 126 of block 10a the Chroma component of the sample 126 based on the reconstructed luma component of the sample 126. The linear parameters, namely a and b denoted above, of the scalar linear function are determined block-globally for block 10a by an analysis of statistics of luma and chroma components of already reconstructed samples in a neighborhood 112 of block 10a. in particular, the statistical analysis 124 performed by tool 100 is indicated in FIG. 9 at 128 and may determine, for each component, the external luma and chroma values occurring within the reconstructed samples in neighborhood 112. For instance, the average of the two largest luma values might be used as well as the two smallest ones. The same is done for the chroma component to be predicted. Based on the resulting four average values, a measure for the span of luma values and the span of chroma values within the neighborhood 112 is determined and the ratio there between is used as slope of the scalar linear function for the linear mapping 106. The average of the smallest values for luma–the slope×the average of smallest values for chroma is used for determining the intercept of the scalar linear function. The parameter derivation 108, thus performed, yields the scalar linear function and each luma sample of the reconstructed luma component 124 is used to predict the corresponding chroma sample value within block 10a, thereby yielding the chroma inter-component prediction signal for block 10a. not shown in FIG. 9, but possible, the data stream may have a chroma residual signal coded therein in order to correct the chroma inter-component prediction signal for chroma component $C_1$ and/or $C_2$.

Again, tool 100 is another example for coding tool 350 in FIG. 6. In other words, whether or not coding tool is applied for a block 10a of a picture may be decided in accordance with any of the options discussed with respect to FIG. 6. Notably, VVC does not provide any means for pictureglobally or at least slice-globally deactivate tool 100, but in accordance with an embodiment described later on, such a signalization is proposed, thereby avoiding the detrimental drift caused by exactly tool 100. Being more precise, tool 100 may be an example for coding tool 350 in FIG. 6 where an explicit signaling in the form of syntax element 353 is used to control the application of tool 100 with respect to block 10. The syntax element could be a flag, for instance, switching on or off tool 100 for block 10. Two possibilities exist with respect to the discussion of the encoding constrained indication discussed with respect to the embodiments later on: it could only inform the recipient, i.e., the decoder, on the fact that all syntax elements 353, for a certain picture 12, indicate non-application of tool 100, or it could alternatively also act as a configuration signaling which deactivates tool 100 with respect to picture 12 as a consequence of which the data stream would not convey any syntax elements 353 for blocks 10 inside that picture 12. Taking VVC as an example, for instance, no configuration signaling is present in order to, at a granularity of pictures or slices, deactivate tool 100. In VVC, such configuration signaling is only present for controlling the activation of tool 100 for a sequence of pictures. A RASL wise deactivation is, thus, not feasible.

An even further new tool was introduced to the loop filtering stage of VVC and is referred to Luma Mapping and Chroma Scaling (LMCS) in which chroma sample values undergo a scaling using parameters derived from the luma samples as illustrated in FIG. 10.

Here too, a chroma-to-luma dependency is present, but less pronounced than in the case of CCLM. During the chroma scaling part of the process, the transformed and dequantized chroma residual is scaled according to model parameters derived from the luma samples of the neighboring virtual pipeline data units (VPDUs). CCLM relies on the samples of neighboring VPDUs for the purpose of pipeline latency reduction. In LMCS though, all of the neighboring luma samples are accounted for, allowing to average out drift outliers in the VPDUs neighboring samples. Also, the model parameters are used to scale the residual signal, which does not aggregate drift but is directly signaled. For those reasons to tool has much less potential to amplify drift, but should still be considered when encoding for controlled drift applications.

The mode of operation for LMCS tool 200 is depicted in FIG. 11. The idea here is to perform a luma tool mapping 212 so as to perform luma component prediction 202 and luma component residual decoding 204 for a predetermined picture 12 in a coding luma tone scale 208 rather than a presentation luma tone scale 210. To be more precise, while reconstructed luma values may represent a luma component of the reconstructed signal for picture 12 on a linear scale at a certain bit depth, the luma tone mapping 212 may map this scale 210 onto a coding scale 208 using a certain tone mapping function such as a picture-wise linear tone mapping function or some other tone mapping function. The tone mapping function may be signaled at the data stream such as a picture parameter set for picture 12. The function is determined by the encoder appropriately. Thus, an interprediction signal obtained by inter-prediction 202 for a block 10b of picture 12 is subject to luma tone mapping 212 before being combined with a residual signal 204 at the coding scale 208 to yield the reconstructed luma component for picture 12. For intra-predicted blocks, inter-prediction 206 is used. Intra-prediction is performed within coding scale 208 domain. A further goal of tool 200 is to control the quantization error of the chroma component according to the luma tone mapping 212. That is, the chroma component quantization error is controlled for each block individually and adapted to the influence of the luma component by the luma tone mapping 212. To this end, a chroma residual scale factor 216 is determined for block 10b of picture 12 from an average 220 of the coding luma tone scale version of the reconstructed luma component of picture 12 within a neighborhood 222 of picture block 10b. A chroma residual signal 224 decoded for picture block 10b from the data stream is scaled 226 according to the thus determined chroma residual scale factor 216 and, this scale, used to correct 228 and intra-chroma prediction signal 230 for picture block 10b. The intra-chroma prediction signal 230 may use the same prediction tools or a subset thereof, compared to the luma component. By using the neighborhood 222 for determining the average 220, the luma and chroma components for block 10b may be reconstructed in parallel rather than serially. The reconstructed luma and chroma components of picture 12 are then subject to inverse luma tone mapping 240 to yield the reconstructed final result for picture 12 and yield the basis for pictures to be coded/decoded next, namely to serve as a reference picture for this subsequently coded/decoded pictures.

With respect to coding tool 200, the same note is valid as is done with the other coding tools discussed with respect to the previous figures, namely coding tool 200 is an example for coding tool 350 of FIG. 6 nor the options for deciding on the application of this coding tool for a particular block discussed with respect to FIG. 6 may be used. As an example, the block-wise decision 356 may be left off with respect to coding tool 300, but configuration signaling may be used to control the application on a picture by picture or slice by slice basis.

Errors in predicted MVs from syntax-to-syntax and sample-to-syntax inter-prediction tools have comparatively high potential to lead to severe artefacts in the subsequent sample-to-sample prediction tools that use these erroneously predicted MVs as spatial or temporal MV candidates. This is especially valid for (SB)TMVP that exhibits the most visible artefacts in open GOP switching and also DMVR as errors in wrongful motion vectors may propagate over subsequent pictures with increasing magnitude. However, same also applies to other prediction models, e.g. CCLM and/or LMCS, that are carried out based on parameters derived from the reconstructed sample values. FIG. 12 illustrates the effect of general syntax or parameter prediction errors on the visual and objective quality of the RASL pictures using a GOP size of 32 pictures in regular open GOP coding. It is evident that RASL pictures suffer from significant artefacts in the luma as well as chroma components of the reconstructed pictures.

A third issue in open GOP switching can arise from usage of Adaptation Parameter Sets (APSs) in VVC which carry filter coefficients for the Adaptive Loop Filter (ALF), parameters for Luma Mapping with Chroma Scaling (LMCS) and quantization scaling lists. As RASL pictures may refer to APSs transmitted before the respective CRA in decoding order which are available during continuous decoding but are unavailable when random accessing at the CRA picture as the associated RASL pictures are dropped in this case. Therefore, open GOP resolution switching can cause references to missing APSs that crash a non-error-resilient decoder or create visual artefacts when using parameters of wrong APSs with a coincidentally matching identifier value. Similar to syntax prediction tools, this issue has a high potential to create a visual disturbance up to complete decoder failures.

In order to prevent the issues described above when performing open GOP resolution switching, a constrained VVC encoding method, that consists of three pillars, may be used described in the following.

First, the RASL pictures associated with a CRA are constrained so that no picture preceding the CRA in decoding order is selected as collocated reference picture to perform syntax-to-syntax prediction, i.e. (SB)TMVP. Thereby, the exact same reference pictures and motion information are used as on encoder side and any syntax prediction error from incorrect source motion information through earlier segments pictures is prevented. In a possible implementation, the first RASL picture in decoding order is limited to use only its associated CRA picture as collocated reference picture which naturally hosts only zero motion vectors while further RASL pictures have access to non-zero temporal MV candidates of the first RASL picture and following pictures in decoding order. With respect to sample-to-syntax prediction tools, DMVR is disabled for all RASL pictures with active reference pictures preceding the associated CRA. in decoding order. In another alternative, DMVR is disabled for all RASL pictures, regardless of their reference pictures and in a further alternative, DMVR is disabled only for RASL pictures that serve as a collocated reference picture for following pictures and in an even further alternative, DMVR is disabled for all RASL pictures except for RASL pictures that are of the highest temporal layer and are thereby not used as reference. Thereby, erroneous sample values of reference pictures from earlier segments that differ from encoder-side or drift-affected samples of other RASL pictures do not cause errors in the sample-to-syntax prediction.

In order to ensure VVC conformance after a segment switch, further tools have to be constrained for all RASL pictures with reference pictures preceding the associated CRA, i.e. usage of the optical flow related tools BDOF and PROF is disabled. In an alternative, it may be that, for the sake of simplicity, BDOF and PROF are disabled for all RASL pictures. In addition the new feature of VVC of independently coded subpictures within a video which, for instance, is useful in 360-degree viewport dependent video streaming, has to be disabled to use RPR. All of the above tool constraints are also part of conformance constraints defined in the VVC specification to enable RPR. Beyond the conformance constraints associated with RPR usage in VVC even further tool constraints are required as prediction techniques which employ parameter prediction from reconstructed samples may also results in noticeable artefacts. Hence, in our implementation CCLM is disabled through encoder-side search algorithm block-wise constraints as current VVC syntax only allows sequence-wise disabling which imposes a significant reduction in overall coding efficiency. This effectively allows to ensure encoder sided avoidance of the drift, but it cannot be easily confirmed on the decoder without thorough low-level parsing. Also, since the tool is enabled, but not used, unnecessary bits (i.e. coding unit level flags for CCLM usage such as cclm_mode_flag or cclm_mode_idx) are being sent to signal the encoding decision not to use it.

Second, also for an open GOP coding structure, i.e. the CRA pictures followed by its associated RASL pictures in decoding order, the necessary APS for all pictures need to be present within the segment. Note that for random accessing open GOP streams such a constraint is not necessary and RASL pictures are allowed to refer to APSs transmitted in the bitstream before the associated CRA pictures in decoding order. Since when random accessing such at a such CRA pictures, RASL pictures are dropped and this referencing is not problematic. Also, when no switch is performed such APSs are available in continuous decoding. However, these APSs may not be available in streaming with open GOP switching and therefore need to be prevented from being referred to. In our implementation, the processing related to ALF, LMCS and quantization scaling lists is reset in a similar fashion as for closed GOP coding structures.

Third, from the perspective of VVC high level syntax, the individual encoding of variants in the bitstream ladder has to be carried out in a coordinated fashion with the target of open GOP switching on decoder side in mind. Therefore, the Sequence Parameter Sets (SPSs) of all segment variants need to be aligned so that segment switching does not trigger the start of a new coded layer video sequence through changes in the SPS. For instance, with proper coordination, the SPS would indicate the maximum resolution within the bitstream ladder, matching block sizes and chroma formats, a proper matching level indicator and the relevant constraint flags such as gci_no_res_change_in_clvs_constraint_flag, sps_ref_pic_resampling_enabled_flag and sps_res_change_in_clvs_allowed_flag with appropriate configuration to enable usage of RPR on decoder side. Devices with lower capabilities than required for the indicated maximum resolution or level need to be served with an adjusted SPS through system mechanisms.

RPR in VVC has been designed in a constrained manner to limit its implementation and runtime complexity as evident from the above tool constraint discussion. An important aspect in this complexity consideration is that memory bandwidth while accessing scaled reference samples in RPR usage is acceptable and not significantly higher than without RPR. Coded pictures in VVC are accompanied with a so-called scaling window that is used to determine the scaling factor between two pictures. In order to set a bound to the memory bandwidth requirements of RPR, relation of scaling windows of pictures using RPR and scaling windows of their reference pictures is limited to allow an eightfold upscaling and a twofold downscaling at maximum. In other words, assuming each scaling window matches the picture size of its representation, it is allowed to use RPR when switching to a representation that has eightfold higher pictures sizes. However, down-switching may only use RPR if the picture size decreases by no less than half in each dimension.

Typically, in adaptive streaming scenarios, it is the case that up-switching is carried out in a progressive manner, i.e. increasing resolution or quality gradually. However, when it comes to down-switching, it might happen that when the buffer of a player is starving, the player switches to the lowest quality to avoid buffer underruns, which means that downward switches likely do not happen progressively. One way to mitigate this limitation of RPR in VVC is to encode the lowest quality representation with closed GOP structures so that it can serve as a fallback for when picture sizes decrease to less than half during such non-progressive down-switching events.

In the following, embodiments are described that relate to decoders and encoders supporting one, more or all of the coding tools 100, 200, 300, 400 and 500 discussed above. Decoders and encoders described next may be implemented in a manner complying with FIGS. 1 and 2. Although the tools 100, 200, 300, 400 and 500 have been discussed above primarily with respect to the decoder side, it is clear that the description of the corresponding tools readily transferable onto the encoder side, the difference being that the encoder inserts involved information into the data stream rather than decoding it therefrom. Each coding tool supported represents one coding tool 350. Any coding tool using explicit syntax element control 353 on a block basis, involves the encoder encoding the syntax element on a block basis and the decoder decoding same from the data stream. Coding tool 100 may be the only one using this explicit block-basis syntax element. The other coding tools 200, 300, 400 and 500 may use an inherent block-basis application decision 356 along with a picture-basis or slice-basis configuration signaling for deactivating the tool completely.

The subsequently explained embodiments relate to an indication or signaling indicating to the decoder whether or not certain encoding constraints relating to the usage of the just-mentioned set of one or more coding tools has been obeyed or not. The encoder signals this indication in the data stream and restricts its encoding accordingly by obeying the corresponding encoding constraints. The decoder, in turn, uses the indication and interprets it as a guarantee or indication of drift limitation in case of segment switching. According to an alternative embodiment, the indication/signaling discussed below could also be used to actually deactivate one or more of the coding tools. For instance, in VVC, it is up to now not possible to deactivate, on a picture or slice basis, tool 100. The indication/signaling discussed below could, in addition to the promise function, assume the function of the configuration signaling so as to deactivate tool 100 with respect to certain pictures/slices. The block-basis syntax elements for the block-basis decision 356 could then be left off and not coded into and decoded from the data stream.

Subsequently, combinations are presented which use a signaling of the presented constraints to enable open GOP resolution switching, i.e. that RASL pictures of a CRA can be decoded with acceptable drift when performing stream switching as certain coding tools are not active in the RASL pictures. While state-of-the-art allows such indication for some of the tools that are part of the presented method, e.g. TMVP, SBTMVP, BDOF, PROF, and DMVR, there are notable additional constraints in the presented method that are required to avoid serious artefacts from sample-to-syntax prediction tools namely CCLM and/or LMCS. There hence is a need to have an encoder be able to indicate in a bitstream that such tools are not active for certain pictures, i.e. the RASL pictures of a CRA.

VVC features an extension mechanism to add bit flags to the picture header (PH) and slice header (SH) syntax in a backwards compatible way. For this purpose, the respective SPS indicates the number of extra bits for such purpose in the PH or SH syntax, that have to be parsed when reading the syntax and a derivation is used to assign this extra bits to flags or variable values. The following table shows the respective SPS and PH syntax accompanied by the respective semantics. SH syntax and semantics are similar to PH syntax and semantics.

| | Descriptor |
|---|---|
| seq_parameter_set_rbsp( ) { | |
| [...] | |
| sps_num_extra_ph_bytes | u(2) |
| for( i = 0; i < (sps_num_extra_ph_bytes * 8 ); i++ ) | |
| sps_extra_ph_bit_present_flag[ i ] | u(1) |
| [...] | | sps_extra_ph_bit_present_flag[i] equal to 1 specifies that the i-th extra bit is present in PH syntax structures referring to the SPS. sps_extra_ph_bit_present_flag[i] equal to 0 specifies that the i-th extra bit is not present in PH syntax structures referring to the SPS.

The variable NumExtraPhBits is derived as follows:
NumExtraPhBits=0
for(i=0; i<(sps_num_extra_ph_bytes*8); i++)
   if(sps_extra_ph_bit_present_flag[i]) (1)
      NumExtraPhBits++

|  | Descriptor |
|---|---|
| picture_header_structure( ) {<br>  [...]<br>  for( i = 0; i < NumExtraPhBits; i++ )<br>    ph_extra_bit[ i ]<br>  [...] | <br><br><br>u(1)<br> | ph_extra_bit[i] could have any value. Decoders conforming to this version of this Specification shall ignore the presence and value of ph_extra_bit[i]. Its value does not affect the decoding process specified in this version of this Specification.

An unaware decoder can at least correctly parse the bitstream and decode it correctly, while a decoder aware of the extra bits meaning can further interpret the extra bit indication and act accordingly, e.g. advice a client that stream switching is possible without serious drift as constraints according to the presented method are met. Likewise, a file format packager, a HTTP streaming server or even RTP streaming server can take this bitstream indication into account in packaging, offering and serving the content in a manner making usage of bitstream switching.

An embodiment of the invention is to carry the indication of the presented method in the extra bits of the PH or SH syntax of the RASL pictures or the associated CRA picture as follows. In the SPS semantics, a specific extra bit flag is identified through index i of sps_extra_ph_bit_present_flag[i] as indicating the presence of the PH/SH extra bit flag that indicates the presented method. For instance, the first extra bit presence in the PH can be identified as through the first SPS PH extra bit (i=0) of the first SPS PH extra byte as follows.

The value of the variable ConstraintMethodFlagPresentFlag is set equal to sps_extra_ph_bit_present_flag[0]. Note that index 0 is used but another index could be used instead, i.e., a bit among sps_extra_ph_bit_present_flag[i] is selected to have the meaning that RASL pictures are constraint in terms of tools being used.

In the PH semantics, the respective variable indicating a flavor of the presented constraint method is derived as follows.

The value of the variable ConstrainedRASLFlagEnabledFlag/ConstrainedCRAFlagEnabledFlag is set equal to (ConstraintMethodFlagPresentFlag && ph_extra_bit[0]). Note that index 0 is used but depending on the values indicated by sps_extra_ph_bit_present_flag[i] and which index is used for the constraints for RASL pictures ph_extra_bit[j] the j-th flag of the extra flags in the PH would indicate whether the constraints are in place for RASL pictures or not.

Alternative 1 (carry signalling in RASL pictures): When ConstrainedRASLFlagEnabledFlag is equal to 1, the current picture is encoded without use of CCLM. PH/SH control flags as well as sequence level constraint flag for BDOF, DMVR, PROF, (SB)TMVP, and LMCS are already in VVC version 1 while CCLM misses a control flag with picture or slice-scope.

Alternative 2 (carry signalling in associated CRA picture): When ConstrainedCRAFlagEnabledFlag is equal to 1, the RASL pictures associated to the current picture are encoded without use of TOOLSET, wherein TOOLSET refers to CCLM and/or LMCS and/or BDOF and/or PROF and/or DMVR and/or RASL pictures do not use any collocated pictures for (sb)TMVP that precedes the current picture (i.e. CRA picture).

An alternative embodiment similar to the above can be constructed for SH signaling for slices of RASL or CRA pictures.

In another alternative embodiment the above constraints are indicated as a property/constraint of the CVS, CLVS and/or Bitstream by adding a general constraint flag in either the DCI, VPS or SPS with the same meaning (e.g., gci_rasl_pictures_tool_constraint_flag or gci_cra_pictures_tool_constraint_flag in the general constraints information syntax) as follows.

Corresponding to alternative 1: gci_rasl_pictures_tool_constraint_flag equal to 1 specifies that ConstrainedRASLFlagEnabledFlag for all RASL pictures in OlsInScope shall be equal to 1. gci_rasl_pictures_tool_constraint_flag equal to 0 does not impose such a constraint.

Corresponding to alternative 2: gci_cra_pictures_tool_constraint_flag equal to 1 specifies that ConstrainedCRAFlagEnabledFlag for all CRA pictures in OlsInScope shall be equal to 1. gci_cra_pictures_tool_constraint_flag equal to 0 does not impose such a constraint.

I.e. when such a general constraint flag is set, all the RASL pictures associated with a CRA in the CVS, CLVS, and/or Bitstream are encoded without use of TOOLSET— wherein TOOLSET refers to CCLM and/or LMCS and/or BDOF and/or PROF and/or DMVR and/or RASL pictures do not use any collocated pictures for (sb)TMVP that precedes the current picture (i.e. CRA picture).

In another alternative embodiment, the above constraints are indicated in a PPS extension syntax. The RASL pictures associated with a CRA can refer to an PPS indicating that the above constraints are active while other pictures of the bitstream do refer to a PPS that does not indicate the above constraints.

In another alternative embodiment, the above constraint signaling is carried out through an SEI message either in the CRA picture or in the associated RASL picture or for a whole coded layer video sequence of pictures.

In another alternative embodiment, the above constraint signaling is used to conditionally send CCLM flags on the coding unit level.

In another alternative embodiment, the above constraint signalling does not apply to all RASL pictures associated with a CRA but is limited to a subset of RASL pictures depending on the actual tool in a consideration of acceptable drift and incurring coding efficiency penalty:

DMVR: (same as in above description text): DMVR is disabled for all RASL pictures with active reference pictures preceding the associated CRA in decoding order. Note that a current picture can have active reference pictures (actually used for prediction) in its reference picture list(s) (RPL) and inactive reference pictures which are not used to predict samples or syntax of the current picture, but subsequent (in decoding order) pictures, and which, therefore, are not ready to be removed from the decoded picture buffer (DPB). In another alternative, DMVR is disabled for all RASL pictures, regardless of their reference pictures and in a further alternative, DMVR is disabled only for RASL pictures that serve as a collocated reference picture for following pictures and in an even further alternative, DMVR is disabled for RASL pictures that do not belong to the highest temporal layer. The alternatives may be combined.

BDOF & PROF: disabled for all RASL pictures or only for RASL pictures with active reference pictures preceding the associated CRA in decoding order.

According to an embodiment, the indication is signaled in the data stream in form of an SEI message. As mentioned above, the SEI message may be valid for all pictures of the sequence of pictures, e.g. a coded video sequence, CVS. E.g., the SEI message may be signaled in the sequence. Accordingly, the decoder may infer from the presence of the SEI message, or from an indication in the SEI message, that all RASL pictures of the sequence are coded in the manner excluding the predetermined set of coding tools. For example, according to this embodiment, the set of coding tools comprises at least the cross-component linear model based prediction tool 100 and the decoder-side motion vector refinement tool 400.

In the following, further embodiments of the above described invention are described.

D1.1. Video decoder for decoding a video from a data stream, configured to
- decode an indication [e.g. gci_rasl_pictures_tool_constraint_flag] from the data stream which is valid for a sequence of pictures of the video and indicates that, RASL pictures within the sequence of pictures, are coded in a manner excluding a predetermined set of one or more coding tools [e.g. as a kind of promise so that the decoder knows that open GOP switching by concatenating separately coded open GOP versions of the video, coded at different spatial resolution and/or different SNR, does not lead to too much drift in RASL pictures].

D1.2. Video decoder of any previous embodiment D1.#, wherein the set of one or more coding tools comprises a cross-component linear-model based prediction tool (100).

D1.3. Video decoder of embodiment D1.2, wherein, according to the cross-component linear-model based prediction tool,
- a chroma component (102) of a picture block (10*a*) is predicted from a luma component (104) of the picture block (10*a*) using a linear model (106) whose parameters are determined (108) from extremal luma and chroma values (110) in an already decoded neighborhood (112) of the picture block.

D1.4. Video decoder of any previous embodiment D1.#, wherein the set of one or more coding tools comprises a luma tone mapping and chroma residual scaling prediction tool (200).

D1.5. Video decoder of embodiment D1.4, wherein, according to the luma tone mapping and chroma residual scaling prediction tool,
- a luma component prediction (202) [e.g. inter prediction] and a luma component residual decoding (204) for a predetermined picture (12) is performed in a coding luma tone scale (208), onto which a presentation luma tone scale (210) is mapped by a luma tone mapping (212), to obtain a coding luma tone scale version (214) of a reconstructed luma component of the predetermined picture,
- a chroma residual scale factor (216) for a picture block (10*b*) of the predetermined picture is determined from an average (220) of the coding luma tone scale version of the reconstructed luma component of the predetermined picture within a neighborhood (222) of the picture block, and a chroma residual signal (224) decoded for the picture block from the data stream is scaled (226) according to the chroma residual scale factor and used to correct (228) an intra-chroma prediction signal (230) for the picture block.

D1.6. Video decoder of any previous embodiment D1.#, wherein the set of one or more coding tools comprises an optical flow tool (300).

D1.7. Video decoder of embodiment D1.6 wherein the optical flow tool is
- for improving a translatory inter-prediction signal of a predetermined inter-predicted block (10*c*) by means of optical flow-based analysis.

D1.8. Video decoder of any previous embodiment D1.#, wherein the set of one or more coding tools comprises an decoder-side motion vector refinement tool (400).

D1.9. Video decoder of embodiment D1.8 wherein the decoder-side motion vector refinement tool is
- for improving a signaled motion vector (402) coded in the data stream for inter-predicting a predetermined inter-predicted block (10*d*) from a reference picture (404) by refining the signaled motion vector by performing a best match search among motion vector candidates at and around the signaled motion vector.

D1.9a. Video decoder of embodiment D1.9 wherein the decoder-side motion vector refinement tool is configured to
- perform the best match search using an already decoded neighborhood of the inter-predicted block with respect to the reference picture.

D1.9b. Video decoder of embodiment D1.8 wherein the decoder-side motion vector refinement tool is configured to
- refine a pair of signaled motion vectors (402) coded in the data stream for inter-predicting a predetermined inter-bi-predicted block (10*d*) from a pair of reference pictures (404), positioned temporally before and behind [in presentation order] a picture of the predetermined inter-bi-predicted block (10*d*), by performing a best match search among motion vector pair candidates including and around the pair of signaled motion vectors.

D1.10. Video decoder of any previous embodiment D1.#, wherein the set of one or more coding tools comprises a temporal motion vector prediction tool (500).

D1.11. Video decoder of embodiment D1.10 wherein, according to which the temporal motion vector prediction tool, motion vector candidate list formation for inter-predicted blocks includes motion vector candidate recruiting from a previously decoded picture (502).

D1.12. Video decoder of embodiment D1.11 wherein, according to which the temporal motion vector prediction tool, motion vector candidate list formation for inter-predicted blocks includes motion vector candidate recruiting from a block (506) of the previously decoded picture, pointed to by a motion vector predictor (504).

D1.13. Video decoder of embodiment D1.12 wherein the motion vector predictor includes a temporal motion vector predictor.

D1.14. Video decoder of any previous embodiment D1.#, wherein the indication is included in one of
- a decoder capability information section of the data stream, and
- a video or sequence parameter set of the data stream, and
- a supplemental enhancement information message.

D1.15. Video decoder of any previous embodiment D1.#, wherein the indication comprises one bit which collectively indicates the exclusion of all coding tools of the predetermined set of one or more coding tools with respect to the coding of the RASL pictures within the sequence of pictures.

D1.16. Video decoder of any previous embodiment D1.#, wherein the decoder is configured to support reference picture resampling.

D1.17. Video decoder of embodiment D1.16, wherein, according to the reference picture resampling, a reference picture of an inter-predicted block is subject to the sample re-sampling so as to bridge a scaling window size deviation or sample resolution deviation between the reference picture and a picture in which the inter-predicted block is contained to provide an inter-prediction signal for the inter-predicted block.

D1.18. Video decoder of any of previous embodiments D1.#, wherein the set of one or more coding tools comprises [e.g. 200, 300, 400, 500]
one or more first inherently applied coding tools each of which is, for a predetermined block, applied depending on one or more coding options signaled in the data stream for the predetermined block, and relating to a further coding tool other than the respective further coding tool, and/or
one or more second inherently applied coding tools each of which is, for a predetermined block, applied depending on a size of the predetermined block.

D1.19. Video decoder of any of previous embodiments D1.#, wherein the set of one or more coding tools comprises [e.g. 100, 500]
one or more explicitly applied coding tools each of which is, for a predetermined block, applied to the predetermined block depending on a syntax element coded into the data stream for exclusively signaling the application of the respective coding tool for the predetermined block.

D1.20. Video decoder of embodiment D1.19, wherein the decoder is configured to decode the syntax element from the data stream for blocks within the RASL pictures as well as for blocks of pictures other than the RASL pictures.

D1.21. Video decoder of embodiment D1.19, wherein the decoder is configured to decode the syntax element from the data stream for blocks within picture other than RASL pictures only [e.g. thereby saving bits in the RASL pictures].

D1.22. Video decoder of any of previous embodiments D1.#, wherein the decoder is configured to support intra-prediction block decoding modes and inter-prediction block decoding modes.

D1.23. Video decoder of any of previous embodiments D1.#, wherein the sequence of pictures
starts at, and includes, one CRA picture, and comprises pictures up to—in coding order-, and ending at, a picture immediately preceding a CRA picture, or
comprises pictures which are consecutive in coding order and comprise more than one CRA.

D1.24. Video decoder of any of previous embodiments D1.#, wherein the set of one or more coding tools comprises
one or more deactivatable coding tools each of which is, with respect to its application to pictures blocks, deactivatable in units of pictures or slices by configuration signaling inside the data stream.

D1.25. Video decoder of any of previous embodiments D1.#, configured to use the indication to see whether open GOP switching leads to endurable drift.

D1.25a. Video decoder of any of previous embodiments D1.#, configured to use the indication to see whether open GOP switching leads to sample mismatch, but preserves syntax and parameter settings.

D1.26. Video decoder of any of previous embodiments D1.#, wherein
the indication indicates that all RASL pictures within the sequence of pictures are coded in the manner excluding the predetermined set of one or more coding tools, and/or
the indication indicates that all RASL pictures within the sequence of pictures are coded in the manner excluding the predetermined set of one or more coding tools, which have reference pictures preceding, in decoding order, a CRA picture with which same are associated, and/or
the indication indicates that all RASL pictures within the sequence of pictures are coded in the manner excluding the predetermined set of one or more coding tools, which serve as a temporal motion vector prediction reference picture for following pictures, and/or
the indication indicates that all RASL pictures within the sequence of pictures are coded in the manner excluding the predetermined set of one or more coding tools, which do not belong to a highest temporal layer.

D1.27. Video decoder of any of previous embodiments D1.#, wherein
the indication indicates that the RASL pictures within the sequence of pictures are coded in the manner excluding the predetermined set of one or more coding tools in a manner so that
for a first subset of one or more coding tools out of the predetermined set of one or more coding tools, all RASL pictures to which a first characteristic applies are coded in the manner excluding the first subset of one or more coding tools out of the predetermined set of one or more coding tools and
for a second subset of one or more coding tools out of the predetermined set of one or more coding tools, all RASL pictures to which a second characteristic applies, or all RASL pictures, are coded in the manner excluding the second subset of one or more coding tools out of the predetermined set of one or more coding tools, the first and the second subset being mutually disjoint.

D1.28. Video decoder of embodiment D1.27, wherein the first characteristic and/or the second characteristic is selected out of
having reference pictures preceding, in decoding order, a CRA picture with which same are associated,
serving as a temporal motion vector prediction reference picture for following pictures, and
not belonging to a highest temporal layer.

D1.29. Video decoder of embodiment D1.27 or higher, wherein
the first subset includes one or more of a decoder-side motion vector refinement tool and a temporal motion vector prediction tool.

D1.30. Video decoder of embodiment D1.29, wherein the first characteristic is selected out of
having reference pictures preceding, in decoding order, a CRA picture with which same are associated,
serving as a temporal motion vector prediction reference picture for following pictures, and
not belonging to a highest temporal layer.

D2.1. Video decoder for decoding a video from a data stream, configured to
 decode an indication [e.g. using sps_extra_ph_bit_present_flag and ph_extra_bit, or using gci_rasl_pictures_tool_contraint_flag] from the data stream which indicates, per picture of a sequence of pictures of the video, globally for the respective picture, or on a per slice basis, whether the respective picture is coded in a manner excluding a predetermined set of one or more coding tools, the predetermined set comprising a cross-component linear-model based prediction tool [e.g. as a kind of picture wise indication that makes it possible to see that potential drift at RASL pictures is sufficiently low].

D2.2. Video decoder of any of previous embodiments D2.#, wherein the decoder is configured to support intra-prediction block decoding modes and inter-prediction block decoding modes.

D2.3. Video decoder of any previous embodiment D2.#, wherein, according to the cross-component linear-model based prediction tool,
 a chroma component of a picture block is predicted from a luma component of the picture block using a linear model whose parameters are determined from extremal luma and chroma values in an already decoded neighborhood of the picture block.

D2.4. Video decoder of any previous embodiment D2.#, wherein the set of one or more coding tools further comprises
 a luma tone mapping and chroma residual scaling prediction tool.

D2.5. Video decoder of embodiment D2.4, wherein, according to the luma tone mapping and chroma residual scaling prediction tool,
 a luma component prediction and a luma component residual decoding for a predetermined picture is performed in a coding luma tone scale, onto which a presentation luma tone scale is mapped by a luma tone mapping, to obtain a coding luma tone scale version of a reconstructed luma component of the predetermined picture,
 a chroma residual scale factor for a picture block of the predetermined picture is determined from an average of the coding luma tone scale version of the reconstructed luma component of the predetermined picture within a neighborhood of the picture block, and
 a chroma residual signal decoded for the picture block from the data stream is scaled according to the chroma residual scale factor ad used to correct an intra-chroma prediction signal for the picture block.

D2.6. Video decoder of any previous embodiment D2.#, wherein the set of one or more coding tools further comprises
 an optical flow tool.

D2.7. Video decoder of embodiment D2.6 wherein the optical flow tool is
 for improving a translatory inter-prediction signal of a predetermined inter-predicted block by means of optical flow-based analysis.

D2.8. Video decoder of any previous embodiment D2.#, wherein the set of one or more coding tools further comprises
 an decoder-side motion vector refinement tool.

D2.9. Video decoder of embodiment D2.8 wherein the decoder-side motion vector refinement tool is
 for improving a signaled motion vector (402) coded in the data stream for inter-predicting a predetermined inter-predicted block (10*d*) from a reference picture (404) by refining the signaled motion vector by performing a best match search among motion vector candidates at and around the signaled motion vector.

D2.9a Video decoder of embodiment D2.9 wherein the decoder-side motion vector refinement tool is configured to
 perform the best match search using an already decoded neighborhood of the inter-predicted block with respect to the reference picture.

D2.9b. Video decoder of embodiment D2.8 wherein the decoder-side motion vector refinement tool is configured to
 refine a pair of signaled motion vectors (402) coded in the data stream for inter-predicting a predetermined inter-bi-predicted block (10*d*) from a pair of reference pictures (404), positioned temporally before and behind a picture of the predetermined inter-bi-predicted block (10*d*), by performing a best match search among motion vector pair candidates including and around the pair of signaled motion vectors.

D2.10. Video decoder of any previous embodiment D2.#, wherein the set of one or more coding tools further comprises
 a temporal motion vector prediction tool.

D2.11. Video decoder of embodiment D2.10 wherein, according to which the temporal motion vector prediction tool, motion vector candidate list formation for inter-predicted blocks includes motion vector candidate recruiting from a previously decoded picture.

D2.12. Video decoder of embodiment D2.11 wherein, according to which the temporal motion vector prediction tool, motion vector candidate list formation for inter-predicted blocks includes motion vector candidate recruiting from a block of the previously decoded picture, pointed to by a motion vector predictor.

D2.13. Video decoder of embodiment D2.12 wherein the motion vector predictor includes a temporal motion vector predictor.

D2.14. Video decoder of any previous embodiment D1.#, wherein the indication is included in one of
 one or more picture parameter sets referred to by the pictures of the sequence of pictures,
 a picture header of the pictures of the sequence of pictures, and
 a slice header of slices of the pictures of the sequence of pictures.

D2.15. Video decoder of any previous embodiment D2.#, wherein the indication is included in
 picture parameter sets referred to by the pictures of the sequence of pictures, wherein the picture parameter sets comprise at least one first picture parameter set indicating that pictures referring to the at least one first picture parameter set is coded in a manner excluding the predetermined set of one or more coding tools, and at least one second picture parameter set indicating that pictures referring to the at least one second picture parameter set is coded in a manner potentially using the predetermined set of one or more coding tools, or
 picture parameter sets referred to by the pictures of the sequence of pictures, wherein the picture parameter sets comprise at least one first picture parameter set indicating that RASL pictures associated with pictures referring to the at least one first picture parameter set is coded in a manner excluding the predetermined set of one or more coding tools, and at least one second picture parameter set indicating that RASL pictures associated with pictures referring to the at least one second picture parameter set is coded in a manner potentially using the predetermined set of one or more coding tools.

D2.16. Video decoder of embodiment D2.15, wherein the indication comprises a syntax element [e.g. using sps_extra_ph_bit_present_flag and ph_extra_bit] within an extension syntax portion of the picture parameter sets.

D2.17. Video decoder of embodiment D2.16, wherein a length of the extension syntax portion of the picture parameter sets is indicted in a sequence or video parameter set of the data stream.

D2.18. Video decoder of any previous embodiment D2.#, wherein the indication is a syntax element in an extension portion of
a picture header of the pictures of the sequence of pictures, and/or a slice header of slices of the pictures of the sequence of pictures,
wherein a length [e.g. NumExtraPhBits] of the extension portion which is indicated a picture or sequence or video parameter set of the data stream.

D2.18a. Video decoder of embodiment D2.18, wherein the syntax element indicates
whether a picture which the syntax element belongs to [e.g. which the picture header or slice header relates to] is coded in a manner excluding the predetermined set of one or more coding tools, or
whether RASL pictures associated with the picture which the syntax element belongs to are coded in a manner excluding the predetermined set of one or more coding tools D2.19. Video decoder of any previous embodiment D2.#, wherein the decoder is configured to support reference picture resampling.

D2.22. Video decoder of embodiment D2.19, wherein, according to the reference picture resampling, a reference picture of an inter-predicted block is subject to the sample re-sampling so as to bridge a scaling window size deviation or sample resolution deviation between the reference picture and a picture in which the inter-predicted block is contained to provide an inter-prediction signal for the inter-predicted block.

D2.23. Video decoder of any of previous embodiments D2.#, wherein the set of one or more coding tools comprises [e.g. 200, 300, 400, 500]
one or more first inherently applied coding tools each of which is, for a predetermined block, applied depending on one or more coding options signaled in the data stream for the predetermined block, and relating to a further coding tool other than the respective further coding tool, and/or
one or more second inherently applied coding tools each of which is, for a predetermined block, applied depending on a size of the predetermined block.

D2.24. Video decoder of any of previous embodiments D2.#, wherein the set of one or more coding tools comprises [e.g. 100, 500]
one or more explicitly applied coding tools each of which is, for a predetermined block, applied to the predetermined block depending on a syntax element coded into the data stream for exclusively signaling the application of the respective coding tool for the predetermined block.

D2.25. Video decoder of embodiment D2.24, wherein the decoder is configured to decode the syntax element from the data stream for blocks within pictures or slices for which the predetermined set of one or more coding tools is signaled to be excluded from encoding, and within pictures or slices for which the predetermined set of one or more coding tools is not signaled to be excluded from encoding.

D2.26. Video decoder of embodiment D2.24, wherein the decoder is configured to decode the syntax element from the data stream for blocks within pictures or slices only for which the predetermined set of one or more coding tools is signaled to be excluded from encoding.

D2.27. Video decoder of any of previous embodiments D2.24 or higher, wherein the cross-component linear-model based prediction tool belongs to the one or more one or more explicitly applied coding tools.

D2.28. Video decoder of any of previous embodiments D2.16 or higher, wherein the syntax element is one bit which collectively indicates the exclusion of all coding tools of the predetermined set of one or more coding tools.

D2.29. Video decoder of any of previous embodiments D2.#, wherein the set of one or more coding tools comprises one or more deactivatable coding tools each of which is, with respect to its application to pictures blocks, deactivatable in units of pictures or slices by configuration signaling inside the data stream.

D2.30. Video decoder of any of previous embodiments D2.#, configured to use the indication to see whether open GOP switching leads to endurable drift.

D2.30a. Video decoder of any of previous embodiments D2.#, configured to use the indication to see whether open GOP switching leads to sample mismatch, but preserves syntax and parameter settings.

E1.1. Video encoder for encoding a video into a data stream, configured to
encode an indication [e.g. gci_rasl_pictures_tool_constraint_flag] into the data stream which is valid for a sequence of pictures of the video and indicates that, RASL pictures within the sequence of pictures, are coded in a manner excluding a predetermined set of one or more coding tools [e.g. as a kind of promise so that the eccoder knows that open GOP switching by concatenating separately coded open GOP versions of the video, coded at different spatial resolution and/or different SNR, does not lead to too much drift in RASL pictures].

E1.2. Video encoder of any previous embodiment E1.#, wherein the set of one or more coding tools comprises a cross-component linear-model based prediction tool (100).

E1.3. Video encoder of E1.2, wherein, according to the cross-component linear-model based prediction tool,
a chroma component (102) of a picture block (10a) is predicted from a luma component (104) of the picture block (10a) using a linear model (106) whose parameters are determined (108) from extremal luma and chroma values (110) in an already encoded neighborhood (112) of the picture block.

E1.4. Video encoder of any previous embodiment E1.#, wherein the set of one or more coding tools comprises a luma tone mapping and chroma residual scaling prediction tool (200).

E1.5. Video encoder of embodiment E1.4, wherein, according to the luma tone mapping and chroma residual scaling prediction tool,
a luma component prediction (202) [e.g. inter prediction] and a luma component residual encoding (204)

for a predetermined picture (12) is performed in a coding luma tone scale (208), onto which a presentation luma tone scale (210) is mapped by a luma tone mapping (212), to obtain a coding luma tone scale version (214) of a reconstructed luma component of the predetermined picture, a chroma residual scale factor (216) for a picture block (10*b*) of the predetermined picture is determined from an average (220) of the coding luma tone scale version of the reconstructed luma component of the predetermined picture within a neighborhood (222) of the picture block, and a chroma residual signal (224) coded for the picture block in the data stream is scaled (226) according to the chroma residual scale factor and used to correct (228) an intra-chroma prediction signal (230) for the picture block.

E1.6. Video encoder of any previous embodiment E1.#, wherein the set of one or more coding tools comprises an optical flow tool (300).

E1.7. Video encoder of embodiment E1.6 wherein the optical flow tool is
for improving a translatory inter-prediction signal of a predetermined inter-predicted block (10*c*) by means of optical flow-based analysis.

E1.8. Video encoder of any previous embodiment E1.#, wherein the set of one or more coding tools comprises an decoder-side motion vector refinement tool (400).

E1.9. Video encoder of embodiment E1.8 wherein the decoder-side motion vector refinement tool is
for improving a signaled motion vector (402) coded in the data stream for inter-predicting a predetermined inter-predicted block (10*d*) from a reference picture (404) by refining the signaled motion vector by performing a best match search among motion vector candidates at and around the signaled motion vector.

E1.9a. Video encoder of embodiment E1.9 wherein the decoder-side motion vector refinement tool is configured to
perform the best match search using an already decoded neighborhood of the inter-predicted block with respect to the reference picture.

E1.9b. Video encoder of embodiment E1.8 wherein the decoder-side motion vector refinement tool is configured to
refine a pair of signaled motion vectors (402) coded in the data stream for inter-predicting a predetermined inter-bi-predicted block (10*d*) from a pair of reference pictures (404), positioned temporally before and behind a picture of the predetermined inter-bi-predicted block (10*d*), by performing a best match search among motion vector pair candidates including and around the pair of signaled motion vectors.

E1.10. Video encoder of any previous embodiment E1.#, wherein the set of one or more coding tools comprises a temporal motion vector prediction tool (500).

E1.11. Video encoder of embodiment E1.10 wherein, according to which the temporal motion vector prediction tool, motion vector candidate list formation for inter-predicted blocks includes motion vector candidate recruiting from a previously encoded picture (502).

E1.12. Video encoder of embodiment E1.11 wherein, according to which the temporal motion vector prediction tool, motion vector candidate list formation for inter-predicted blocks includes motion vector candidate recruiting from a block (506) of the previously encoded picture, pointed to by a motion vector predictor (504).

E1.13. Video encoder of embodiment E1.12 wherein the motion vector predictor includes a temporal motion vector predictor.

E1.14. Video encoder of any previous embodiment E1.#, wherein the indication is included in one of
a decoder capability information section of the data stream, and
a video or sequence parameter set of the data stream, and
a supplemental enhancement information message.

E1.15. Video encoder of any previous embodiment E1.#, wherein the indication comprises one bit which collectively indicates the exclusion of all coding tools of the predetermined set of one or more coding tools with respect to the coding of the RASL pictures within the sequence of pictures.

E1.16. Video encoder of any previous embodiment E1.#, wherein the encoder is configured to support reference picture resampling.

E1.17. Video encoder of embodiment E1.16, wherein, according to the reference picture resampling, a reference picture of an inter-predicted block is subject to the sample re-sampling so as to bridge a scaling window size deviation or sample resolution deviation between the reference picture and a picture in which the inter-predicted block is contained to provide an inter-prediction signal for the inter-predicted block.

E1.18. Video encoder of any of previous embodiments E1.#, wherein the set of one or more coding tools comprises [e.g. 200, 300, 400, 500]
one or more first inherently applied coding tools each of which is, for a predetermined block, applied depending on one or more coding options signaled in the data stream for the predetermined block, and relating to a further coding tool other than the respective further coding tool, and/or
one or more second inherently applied coding tools each of which is, for a predetermined block, applied depending on a size of the predetermined block.

E1.19. Video encoder of any of previous embodiments E1.#, wherein the set of one or more coding tools comprises [e.g. 100]
one or more explicitly applied coding tools each of which is, for a predetermined block, applied to the predetermined block depending on a syntax element coded into the data stream for exclusively signaling the application of the respective coding tool for the predetermined block.

E1.20. Video encoder of embodiment E1.19, wherein the encoder is configured to encode the syntax element into the data stream for blocks within the RASL pictures as well as for blocks of pictures other than the RASL pictures.

E1.21. Video encoder of embodiment E1.19, wherein the encoder is configured to encode the syntax element into the data stream for blocks within picture other than RASL pictures only [e.g. thereby saving bits in the RASL pictures].

E1.22. Video encoder of any of previous embodiments E1.#, wherein the encoder is configured to support intra-prediction block encoding modes and inter-prediction block encoding modes.

E1.23. Video encoder of any of previous embodiments E1.#, wherein the sequence of pictures
starts at, and includes, one CRA picture, and comprises pictures up to—in coding order-, and ending at, a picture immediately preceding a CRA picture, or comprises pictures which are consecutive in coding order and comprise more than one CRA.

E1.24. Video encoder of any of previous embodiments E1.#, wherein the set of one or more coding tools comprises
one or more deactivatable coding tools each of which is, with respect to its application to pictures blocks, deactivatable in units of pictures or slices by configuration signaling inside the data stream.

E1.25. Video encoder of any of previous embodiments E1.#, configured to obey the indication as an encoding constraint in encoding the video into the data stream.

E1.26. Video encoder of any of previous embodiments E1.#, wherein
the indication indicates that all RASL pictures within the sequence of pictures are coded in the manner excluding the predetermined set of one or more coding tools, and/or
the indication indicates that all RASL pictures within the sequence of pictures are coded in the manner excluding the predetermined set of one or more coding tools, which have reference pictures preceding, in decoding order, a CRA picture with which same are associated, and/or
the indication indicates that all RASL pictures within the sequence of pictures are coded in the manner excluding the predetermined set of one or more coding tools, which serve as a temporal motion vector prediction reference picture for following pictures, and/or
the indication indicates that all RASL pictures within the sequence of pictures are coded in the manner excluding the predetermined set of one or more coding tools, which do not belong to a highest temporal layer.

E1.27. Video encoder of any of previous embodiments E1.#, wherein
the indication indicates that the RASL pictures within the sequence of pictures are coded in the manner excluding the predetermined set of one or more coding tools in a manner so that
for a first subset of one or more coding tools out of the predetermined set of one or more coding tools, all RASL pictures to which a first characteristic applies are coded in the manner excluding the first subset of one or more coding tools out of the predetermined set of one or more coding tools and for a second subset of one or more coding tools out of the predetermined set of one or more coding tools, all RASL pictures to which a second characteristic applies, or all RASL pictures, are coded in the manner excluding the second subset of one or more coding tools out of the predetermined set of one or more coding tools, the first and the second subset being mutually disjoint.

E1.28. Video encoder of embodiment E1.27, wherein the first characteristic and/or the second characteristic is selected out of
having reference pictures preceding, in decoding order, a CRA picture with which same are associated,
serving as a temporal motion vector prediction reference picture for following pictures, and
not belonging to a highest temporal layer.

E1.29. Video encoder of embodiment E1.27 or higher, wherein
the first subset includes one or more of a decoder-side motion vector refinement tool and a temporal motion vector prediction tool.

E1.30. Video encoder of embodiment E1.29, wherein the first characteristic is selected out of
having reference pictures preceding, in decoding order, a CRA picture with which same are associated,
serving as a temporal motion vector prediction reference picture for following pictures, and
not belonging to a highest temporal layer.

E2.1. Video encoder for encoding a video into a data stream, configured to
encode an indication [e.g. using sps_extra_ph_bit_present_flag and ph_extra_bit, or using gci_rasl_pictures_tool_contraint_flag] into the data stream which indicates, per picture of a sequence of pictures of the video, globally for the respective picture, or on a per slice basis, whether the respective picture is coded in a manner excluding a predetermined set of one or more coding tools, the predetermined set comprising a cross-component linear-model based prediction tool [e.g. as a kind of picture wise indication that makes it possible to see that potential drift at RASL pictures is sufficiently low].

E2.2. Video encoder of any of previous embodiments E2.#, wherein the encoder is configured to support intra-prediction block encoding modes and inter-prediction block encoding modes.

E2.3. Video encoder of any previous embodiment E2.#, wherein, according to the cross-component linear-model based prediction tool,
a chroma component of a picture block is predicted from a luma component of the picture block using a linear model whose parameters are determined from extremal luma and chroma values in an already encoded neighborhood of the picture block.

E2.4. Video encoder of any previous embodiment E2.#, wherein the set of one or more coding tools further comprises
a luma tone mapping and chroma residual scaling prediction tool.

E2.5. Video encoder of embodiment E2.4, wherein, according to the luma tone mapping and chroma residual scaling prediction tool,
a luma component prediction and a luma component residual encoding for a predetermined picture is performed in a coding luma tone scale, onto which a presentation luma tone scale is mapped by a luma tone mapping, to obtain a coding luma tone scale version of a reconstructed luma component of the predetermined picture,
a chroma residual scale factor for a picture block of the predetermined picture is determined from an average of the coding luma tone scale version of the reconstructed luma component of the predetermined picture within a neighborhood of the picture block, and
a chroma residual signal encoded for the picture block from the data stream is scaled according to the chroma residual scale factor ad used to correct an intra-chroma prediction signal for the picture block.

E2.6. Video encoder of any previous embodiment E2.#, wherein the set of one or more coding tools further comprises
an optical flow tool.

E2.7. Video encoder of embodiment E2.6 wherein the optical flow tool is
for improving a translatory inter-prediction signal of a predetermined inter-predicted block by means of optical flow-based analysis.
E2.8. Video encoder of any previous embodiment E2.#, wherein the set of one or more coding tools further comprises
an decoder-side motion vector refinement tool.
E2.9. Video encoder of embodiment E2.8 wherein the decoder-side motion vector refinement tool is
for improving a signaled motion vector (402) coded in the data stream for inter-predicting a predetermined inter-predicted block (10*d*) from a reference picture (404) by refining the signaled motion vector by performing a best match search among motion vector candidates at and around the signaled motion vector.
E2.9a Video encoder of embodiment E2.9 wherein the decoder-side motion vector refinement tool is configured to
perform the best match search using an already decoded neighborhood of the inter-predicted block with respect to the reference picture.
E2.9b. Video encoder of embodiment E2.8 wherein the decoder-side motion vector refinement tool is configured to
refine a pair of signaled motion vectors (402) coded in the data stream for inter-predicting a predetermined inter-bi-predicted block (10*d*) from a pair of reference pictures (404), positioned temporally before and behind a picture of the predetermined inter-bi-predicted block (10*d*), by performing a best match search among motion vector pair candidates including and around the pair of signaled motion vectors.
E2.10. Video encoder of any previous embodiment E2.#, wherein the set of one or more coding tools further comprises
a temporal motion vector prediction tool.
E2.11. Video encoder of embodiment E2.10 wherein, according to which the temporal motion vector prediction tool, motion vector candidate list formation for inter-predicted blocks includes motion vector candidate recruiting from a previously encoded picture.
E2.12. Video encoder of embodiment E2.11 wherein, according to which the temporal motion vector prediction tool, motion vector candidate list formation for inter-predicted blocks includes motion vector candidate recruiting from a block of the previously encoded picture, pointed to by a motion vector predictor.
E2.13. Video encoder of embodiment E2.12 wherein the motion vector predictor includes a temporal motion vector predictor.
E2.14. Video encoder of any previous embodiment D1.#, wherein the indication is included in one of
one or more picture parameter sets referred to by the pictures of the sequence of pictures,
a picture header of the pictures of the sequence of pictures, and
a slice header of slices of the pictures of the sequence of pictures.
E2.15. Video encoder of any previous embodiment E2.#, wherein the indication is included in
picture parameter sets referred to by the pictures of the sequence of pictures, wherein the picture parameter sets comprise at least one first picture parameter set indicating that pictures referring to the at least one first picture parameter set is coded in a manner excluding the predetermined set of one or more coding tools, and at least one second picture parameter set indicating that pictures referring to the at least one second picture parameter set is coded in a manner potentially using the predetermined set of one or more coding tools, or
picture parameter sets referred to by the pictures of the sequence of pictures, wherein the picture parameter sets comprise at least one first picture parameter set indicating that RASL pictures associated with pictures referring to the at least one first picture parameter set is coded in a manner excluding the predetermined set of one or more coding tools, and at least one second picture parameter set indicating that RASL pictures associated with pictures referring to the at least one second picture parameter set is coded in a manner potentially using the predetermined set of one or more coding tools.
E2.16. Video encoder of embodiment E2.15, wherein the indication comprises a syntax element [e.g. using sps_extra_ph_bit_present_flag and ph_extra_bit] within an extension syntax portion of the picture parameter sets.
E2.17. Video encoder of embodiment E2.16, wherein a length of the extension syntax portion of the picture parameter sets is indicted in a sequence or video parameter set of the data stream.
E2.18. Video encoder of any previous embodiment E2.#, wherein the indication is a syntax element in an extension portion of
a picture header of the pictures of the sequence of pictures, and/or
a slice header of slices of the pictures of the sequence of pictures,
wherein a length [e.g. NumExtraPhBits] of the extension portion which is indicated a picture or sequence or video parameter set of the data stream.
E2.18a. Video encoder of embodiment E2.18, wherein the syntax element indicates
whether a picture which the syntax element belongs to [e.g. which the picture header or slice header relates to] is coded in a manner excluding the predetermined set of one or more coding tools, or
whether RASL pictures associated with the picture which the syntax element belongs to are coded in a manner excluding the predetermined set of one or more coding tools
E2.19. Video encoder of any previous embodiment E2.#, wherein the encoder is configured to support reference picture resampling.
E2.22. Video encoder of embodiment E2.19, wherein, according to the reference picture resampling, a reference picture of an inter-predicted block is subject to the sample re-sampling so as to bridge a scaling window size deviation or sample resolution deviation between the reference picture and a picture in which the inter-predicted block is contained to provide an inter-prediction signal for the inter-predicted block.
E2.23. Video encoder of any of previous embodiments E2.#, wherein the set of one or more coding tools comprises [e.g. 200, 300, 400, 500]
one or more first inherently applied coding tools each of which is, for a predetermined block, applied depending on one or more coding options signaled in the data stream for the predetermined block, and relating to a further coding tool other than the respective further coding tool, and/or one or more second inherently applied coding tools each of which is, for a predetermined block, applied depending on a size of the predetermined block.

E2.24. Video encoder of any of previous embodiments E2.#, wherein the set of one or more coding tools comprises
one or more explicitly applied coding tools each of which is, for a predetermined block, applied to the predetermined block depending on a syntax element coded into the data stream for exclusively signaling the application of the respective coding tool for the predetermined block.

E2.25. Video encoder of embodiment E2.24, wherein the encoder is configured to encode the syntax element into the data stream for blocks within pictures or slices for which the predetermined set of one or more coding tools is signaled to be excluded from encoding, and within pictures or slices for which the predetermined set of one or more coding tools is not signaled to be excluded from encoding.

E2.26. Video encoder of embodiment E2.24, wherein the encoder is configured to encode the syntax element into the data stream for blocks within pictures or slices only for which the predetermined set of one or more coding tools is signaled to be excluded from encoding.

E2.27. Video encoder of any of previous embodiments E2.24 or higher, wherein the cross-component linear-model based prediction tool belongs to the one or more one or more explicitly applied coding tools.

E2.28. Video encoder of any of previous embodiments E2.16 or higher, wherein the syntax element is one bit which collectively indicates the exclusion of all coding tools of the predetermined set of one or more coding tools.

E2.29. Video encoder of any of previous embodiments E2.#, wherein the set of one or more coding tools comprises
one or more deactivatable coding tools each of which is, with respect to its application to pictures blocks, deactivatable in units of pictures or slices by configuration signaling inside the data stream.

E2.30. Video encoder of any of previous embodiments E2.#, configured to obey the indication as an encoding constraint in encoding the video into the data stream.

B1.1. Data stream having a video encoded thereinto, comprising
an indication [e.g. gci_rasl_pictures_tool_constraint_flag] which is valid for a sequence of pictures of the video and indicates that, RASL pictures within the sequence of pictures, are coded in a manner excluding a predetermined set of one or more coding tools [e.g. as a kind of promise so that the encoder knows that open GOP switching by concatenating separately coded open GOP versions of the video, coded at different spatial resolution and/or different SNR, does not lead to too much drift in RASL pictures].

B1.2 Data stream according to embodiment 1.1, generated by an encoder according to any of embodiments E1.#.

B2.1. Data stream having a video encoded thereinto, comprising
an indication [e.g. using sps_extra_ph_bit_present_flag and ph_extra_bit, or using gci_rasl_pictures_tool_contraint_flag] which indicates, per picture of a sequence of pictures of the video, globally for the respective picture, or on a per slice basis, whether the respective picture is coded in a manner excluding a predetermined set of one or more coding tools, the predetermined set comprising a cross-component linear-model based prediction tool [e.g. as a kind of picture wise indication that makes it possible to see that potential drift at RASL pictures is sufficiently low].

B2.2 Data stream according to embodiment B2.1, generated by an encoder according to any of embodiments E2.#.

M. Method performed by any of above decoder and encoders.

P. Computer program having a program code for executing the method according to embodiment M, when the program is executed on a computer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] ISO/IEC JTC 1, Information technology—Dynamic adaptive streaming over HTTP (DASH)—Part 1: Media presentation description and segment formats, ISO/IEC 23009-1, 2012 (and subsequent editions).

[2] J. De Cock, Z. Li, M. Manohara, A. Aaron. "Complexity-based consistent-quality encoding in the cloud." 2016 IEEE International Conference on Image Processing (ICIP). IEEE, 2016

[3] DASH Industry Forum Implementation Guidelines. [Online]. Available: https://dashif.org/guidelines/

[4] ITU-T and ISO/IEC JTC 1, Advanced Video Coding for generic audio-visual services, Rec. ITU-T H.264 and ISO/IEC 14496-10 (AVC), May 2003 (and subsequent editions).

[5] ITU-T and ISO/IEC JTC 1, "High Efficiency Video Coding," Rec. ITU-T H.265 and ISO/IEC 23008-2 (HEVC), April 2013 (and subsequent editions).

[6] Y. Yan, M. Hannuksela, and H. Li. "Seamless switching of H. 265/HEVC-coded dash representations with open GOP prediction structure." 2015 IEEE International Conference on Image Processing (ICIP). IEEE, 2015.

[7] ITU-T and ISO/IEC JTC 1, "Versatile video coding", Rec. ITU-T H.266 and ISO/IEC 23090-3 (VVC), August 2020.

[8] V. Baroncini and M. Wien, "VVC verification test report for UHD SDR video content", doc. JVET-T2020 of ITU-T/ISO/IEC Joint Video Experts Team (JVET), 21th meeting: October 2020.

[9] D. Luo, V. Seregin, W. Wan. "Description of Core Experiment 1 (CE1): Reference picture resampling filters", doc. JVET-Q2021 of ITU-T/ISO/IEC Joint Video Experts Team (JVET), 15th meeting: July 2019

[10] H. Schwarz, D. Marpe, and T. Wiegand, "Analysis of hierarchical B pictures and MCTF", ICME 2006, IEEE International Conference on Multimedia and Expo, Toronto, Ontario, Canada, July 2006.

[11] Y.-K. Wang et al., "The High-Level Syntax of the Versatile Video Coding (VVC) Standard" IEEE Trans. Circuits Syst. Video Technol., in press

[12] H. Yang et al., "Subblock based Motion Derivation and Inter-Prediction Refinement in Versatile Video Coding Standard", IEEE Trans. Circuits Syst. Video Technol., in press

[13] W.-J. Chien et al., "Motion Vector Coding and Block Merging in Versatile Video Coding Standard", IEEE Trans. Circuits Syst. Video Technol., in press

The invention claimed is:

1. A method of video encoding, the method comprising: encoding a supplemental enhancement information (SEI) message into a data stream, the SEI message indicating that coding of all random access skipped leading (RASL) pictures within a sequence of pictures is constrained in a manner excluding a predetermined set of one or more coding tools, the predetermined set comprising
a cross-component linear-model based prediction tool and
a decoder-side motion vector refinement tool,
the sequence of pictures comprising at least one random access skipped leading (RASL) picture and a clean random access (CRA) picture associated with the at least one RASL picture.

2. The method of claim 1, wherein the SEI message further indicates that coding of the at least one RASL picture is constrained so that no collocated reference picture used for temporal motion vector prediction (TMVP) or subblock temporal motion vector prediction (sbTMVP) of a motion vector of the at least one RASL picture precedes the CRA picture associated with the RASL picture in decoding order.

3. The method of claim 1, the method further comprising performing reference picture resampling, wherein, according to the reference picture resampling, a reference picture of an inter-predicted block is resampled so as to bridge a scaling window size deviation or sample resolution deviation between the reference picture and a picture in which the inter-predicted block is contained to provide an inter-prediction signal for the inter-predicted block.

4. A video encoder comprising at least one processor, configured to:
encode a supplemental enhancement information (SEI) message into a data stream, the SEI message indicating that coding of all random access skipped leading (RASL) pictures within a sequence of pictures is constrained in a manner excluding a predetermined set of one or more coding tools, the predetermined set comprising a cross-component linear-model based prediction tool and a decoder-side motion vector refinement tool, the sequence of pictures comprising at least one random access skipped leading (RASL) picture and a clean random access (CRA) picture associated with the at least one RASL picture.

5. The video encoder of claim 4, wherein the SEI message further indicates that coding of the at least one RASL picture is constrained so that no collocated reference picture used for temporal motion vector prediction (TMVP) or subblock temporal motion vector prediction (sbTMVP) of a motion vector of the at least one RASL picture precedes the CRA picture associated with the RASL picture in decoding order.

6. The video encoder of claim 4, wherein the at least one processor is configured to perform reference picture resampling, wherein, according to the reference picture resampling, a reference picture of an inter-predicted block is resampled so as to bridge a scaling window size deviation or sample resolution deviation between the reference picture and a picture in which the inter-predicted block is contained to provide an inter-prediction signal for the inter-predicted block.

7. A non-transitory digital storage medium having a computer program stored thereon to perform, when the computer program is run by a computer:

encoding a supplemental enhancement information (SEI) message into a data stream, the SEI message indicating that coding of all random access skipped leading (RASL) pictures within a sequence of pictures is constrained in a manner excluding a predetermined set of one or more coding tools, the predetermined set comprising a cross-component linear-model based prediction tool and a decoder-side motion vector refinement tool, the sequence of pictures comprising at least one random access skipped leading (RASL) picture and a clean random access (CRA) picture associated with the at least one RASL picture.

8. The non-transitory digital storage medium of claim 7, wherein the SEI message further indicates that coding of the at least one RASL picture is constrained so that no collocated reference picture used for temporal motion vector prediction (TMVP) or subblock temporal motion vector prediction (sbTMVP) of a motion vector of the at least one RASL picture precedes the CRA picture associated with the RASL picture in decoding order.

9. The non-transitory digital storage medium of claim 7, wherein the computer program stored thereon further performs, when the computer program is run by the computer, reference picture resampling, wherein, according to the reference picture resampling, a reference picture of an inter-predicted block is resampled so as to bridge a scaling window size deviation or sample resolution deviation between the reference picture and a picture in which the inter-predicted block is contained to provide an inter-prediction signal for the inter-predicted block.

10. A method of video decoding, the method comprising decoding a supplemental enhancement information (SEI) message from a data stream, the SEI message indicating that coding of all random access skipped leading (RASL) pictures within a sequence of pictures is constrained in a manner excluding a predetermined set of one or more coding tools, the predetermined set comprising a cross-component linear-model based prediction tool, and a decoder-side motion vector refinement tool, the sequence of pictures comprising at least one random access skipped leading (RASL) picture and a clean random access (CRA) picture associated with the at least one RASL picture.

11. The method of claim 10, wherein the SEI message further indicates that coding of the at least one RASL picture is constrained so that no collocated reference picture used for temporal motion vector prediction (TMVP) or subblock temporal motion vector prediction (sbTMVP) of a motion vector of the at least one RASL picture precedes the CRA picture associated with the RASL picture in decoding order.

12. The method of claim 10, the method further comprising performing reference picture resampling, wherein, according to the reference picture resampling, a reference picture of an inter-predicted block is resampled so as to bridge a scaling window size deviation or sample resolution deviation between the reference picture and a picture in which the inter-predicted block is contained to provide an inter-prediction signal for the inter-predicted block.

13. A video decoder comprising at least one processor, the at least one processor configured to:

decode a supplemental enhancement information (SEI) message from a data stream, the SEI message indicating that coding of all random access skipped leading (RASL) pictures within a sequence of pictures is constrained in a manner excluding a predetermined set of one or more coding tools, the predetermined set comprising a cross-component linear-model based prediction tool, and a decoder-side motion vector refinement tool, the sequence of pictures comprising at least one random access skipped leading (RASL) picture and a clean random access (CRA) picture associated with the at least one RASL picture.

14. The video decoder of claim 13, wherein the SEI message further indicates that coding of the at least one RASL picture is constrained so that no collocated reference picture used for temporal motion vector prediction (TMVP) or subblock temporal motion vector prediction (sbTMVP) of a motion vector of the at least one RASL picture precedes the CRA picture associated with the RASL picture in decoding order.

15. The video decoder of claim 13, wherein the at least one processor is further configured to perform reference picture resampling, wherein, according to the reference picture resampling, a reference picture of an inter-predicted block is resampled so as to bridge a scaling window size deviation or sample resolution deviation between the reference picture and a picture in which the inter-predicted block is contained to provide an inter-prediction signal for the inter-predicted block.

16. A non-transitory digital storage medium having a computer program stored thereon to perform, when the computer program is run by a computer:

decoding a supplemental enhancement information (SEI) message from a data stream, the SEI message indicating that coding of all random access skipped leading (RASL) pictures within a sequence of pictures is constrained in a manner excluding a predetermined set of one or more coding tools, the predetermined set comprising
a cross-component linear-model based prediction tool, and
a decoder-side motion vector refinement tool,
the sequence of pictures comprising at least one random access skipped leading (RASL) picture and a clean random access (CRA) picture associated with the at least one RASL picture.

17. The non-transitory digital storage medium of claim 16, wherein the SEI message further indicates that coding of the at least one RASL picture is constrained so that no collocated reference picture used for temporal motion vector prediction (TMVP) or subblock temporal motion vector prediction (sbTMVP) of a motion vector of the at least one RASL picture precedes the CRA picture associated with the RASL picture in decoding order.

18. The non-transitory digital storage medium of claim 16, wherein the computer program stored thereon further performs, when the computer program is run by the computer, reference picture resampling, wherein, according to the reference picture resampling, a reference picture of an inter-predicted block is resampled so as to bridge a scaling window size deviation or sample resolution deviation between the reference picture and a picture in which the inter-predicted block is contained to provide an inter-prediction signal for the inter-predicted block.

* * * * *